United States Patent
Ghai et al.

(10) Patent No.: US 9,111,088 B2
(45) Date of Patent: *Aug. 18, 2015

(54) POLICY-BASED PHYSICAL SECURITY SYSTEM FOR RESTRICTING ACCESS TO COMPUTER RESOURCES AND DATA FLOW THROUGH NETWORK EQUIPMENT

(75) Inventors: Vikrant Ghai, Fremont, CA (US); Shailendra Sharma, Milpitas, CA (US); Ajay Jain, San Jose, CA (US)

(73) Assignee: Quantum Security, Inc., San Jose, CA (US)

( * ) Notice: Subject to any disclaimer, the term of this patent is extended or adjusted under 35 U.S.C. 154(b) by 772 days.

This patent is subject to a terminal disclaimer.

(21) Appl. No.: 11/893,056

(22) Filed: Aug. 14, 2007

(65) Prior Publication Data

US 2008/0209505 A1 Aug. 28, 2008

Related U.S. Application Data

(60) Provisional application No. 60/837,754, filed on Aug. 14, 2006.

(51) Int. Cl.
 *G06F 21/00* (2013.01)
 *G06F 21/55* (2013.01)
 *G06F 21/60* (2013.01)
 *G06Q 10/06* (2012.01)
 *G07C 9/00* (2006.01)

(52) U.S. Cl.
 CPC .............. *G06F 21/55* (2013.01); *G06F 21/604* (2013.01); *G06Q 10/06* (2013.01); *G07C 9/00158* (2013.01)

(58) Field of Classification Search
 None
 See application file for complete search history.

(56) References Cited

U.S. PATENT DOCUMENTS

| | | | |
|---|---|---|---|
| 5,557,747 A * | 9/1996 | Rogers et al. | 709/223 |
| 6,233,588 B1 | 5/2001 | Marchoili et al. | |
| 6,253,243 B1 * | 6/2001 | Spencer | 709/224 |
| 6,779,120 B1 * | 8/2004 | Valente et al. | 726/1 |
| 7,328,234 B1 * | 2/2008 | Nedbal et al. | 709/202 |
| 7,779,050 B2 * | 8/2010 | Adamson et al. | 707/809 |
| 7,831,696 B2 * | 11/2010 | Park | 709/223 |
| 8,082,491 B1 * | 12/2011 | Abdelaziz et al. | 715/234 |
| 8,090,839 B2 * | 1/2012 | Kumar et al. | 709/227 |
| 2002/0077996 A1 | 6/2002 | Regelski et al. | |
| 2003/0023874 A1 * | 1/2003 | Prokupets et al. | 713/201 |
| 2003/0110192 A1 * | 6/2003 | Valente et al. | 707/513 |
| 2003/0226109 A1 * | 12/2003 | Adamson et al. | 715/513 |
| 2004/0044912 A1 * | 3/2004 | Connary et al. | 713/201 |
| 2004/0263314 A1 | 12/2004 | Dorai et al. | |
| 2006/0010445 A1 * | 1/2006 | Peterson et al. | 718/100 |
| 2006/0259968 A1 * | 11/2006 | Nakakoji et al. | 726/22 |
| 2007/0011460 A1 | 1/2007 | Brennan et al. | |
| 2007/0186106 A1 | 8/2007 | Ting et al. | |

* cited by examiner

*Primary Examiner* — Dede Zecher
*Assistant Examiner* — Richard McCoy
(74) *Attorney, Agent, or Firm* — Staniford Tomita LLP; Geoffrey T. Staniford

(57) ABSTRACT

Embodiments are directed to systems and methods for integration and normalization of physical security data, states and events to and from disparate physical security systems to maintain in real-time rules based policy state information to enforce physical security policies uniformly across network and information technology (IT) systems. Moreover it pertains specifically to such apparatus for providing an integration platform, methods and processes for normalizing data from physical security systems, to maintain physical security states, mapping to network access and either directly affecting the network equipment through standard programming commands or providing interfaces for network equipment and IT applications to query and determine physical security access states thus enforcing rules in real-time based on security systems data and events.

20 Claims, 14 Drawing Sheets

POLICY-BASED PHYSICAL SECURITY SYSTEM FOR RESTRICTING ACCESS TO COMPUTER RESOURCES AND DATA FLOW THROUGH NETWORK EQUIPMENT

CROSS-REFERENCE TO RELATED APPLICATIONS

The present application claims the benefit of the U.S. Provisional Application, Ser. No. 60/837,754 entitled "Method, process, system and apparatus for building and maintaining policy based physical security service states in real-time that are mapped to network access, data flow and application security policies for the purpose of enforcing and affecting access to applications and data flow through network equipment" and filed on Aug. 14, 2006. The present application is related to co-pending U.S. Patent Application entitled "Physical Access Control and Security Monitoring System Utilizing a Normalized Data Format" filed concurrently herewith.

TECHNICAL FIELD

The embodiments provided herein relate generally to physical security systems, and more specifically to a system for integrating disparate security systems using a rules-based policy engine and normalized data format.

BACKGROUND

Physical security systems include equipment and processes that implement physical security measures for incidents, access control, monitoring systems, lighting, security, audits, inspection, facility management, building automation, and the like. Almost all businesses, large commercial and government facilities, and many homes utilize physical security systems to alert owners and operators about potentially harmful activities such as intrusion, theft, fire, flooding, gas leaks, and so on. Physical Security Systems can comprise a wide range of functions, such as access control, safety and security, and video surveillance that helps protect, monitor or control threats to an organization. Many large businesses and entities also employ access control systems that monitor and control personnel access to physical resources such as buildings and offices, and even asset movement (e.g., products or material) to and from the premises. These systems generally consist of a repository of individual records and access privileges and control access control hardware such as readers (for example cards, biometric sensors) and controllers (for example door controllers) for allowing or disallowing access to physical resources.

Many different physical security systems are available on the market, and are manufactured by a variety of vendors, each of which may have its own standards of data representation and exchange. Large entities, such as big corporations or government departments may utilize multiple physical access control systems distributed across the world, or even within certain locations, such as a single building. These can have multiple representations of individuals or assets, and non-uniform policies for access to physical resources. Besides the representation of entities within the system, alarm triggering events can also be represented differently among different vendors, or even within different security systems from a single vendor. The access and alarm events from different physical security systems generally do not follow standard definitions. This prevents the creation of uniform policy, enforcement and compliance procedures across corporations and multiple systems.

Some attempts have been made to standardize the communication protocols between various building automation systems. One such communication protocol is BACnet for automation and control systems for HVAC (heating ventilating and air conditioning), lighting control, etc. Such communication standards, however, are limited to building automation functions and do not provide seamless integration with other physical security or network security control systems.

An important area of security and control in many modern businesses and organizations is computers, information systems, networks and telecommunications security. Network equipment such as routers control the flow of network packets for IT and network applications such as e-mail, Internet access, file transfers (e.g., FTP), and so on. Network packet routing by network equipment such as routers and security by firewalls is typically performed independently of physical security states or events. Physical security access data and events from physical access control systems, monitoring and surveillance systems such as video, building lighting and control systems, fire/HVAC/temperature/humidity control systems, etc are generally not factored in real-time for either determining individual's access to network and applications resources or affecting the behavior of the network to either enforce security policies or mitigate security risks.

What is needed, therefore, is a system for integrating and normalizing physical security data, states and events from disparate physical security systems, devices and sensors to maintain in real-time rules based policy state information to enforce physical security policies uniformly across network and information technology (IT) systems.

Conversely, what is also needed is a system for integrating data, states and events information from network and information technology systems to maintain in real-time, rules based policy state information to enforce network and IT system policies uniformly across physical security systems and infrastructure.

What is further needed is a method of relating (mapping and correlating) IT & network systems policies with physical security systems policies and vice-versa—physical systems policies with network & IT systems policies on IP based network appliances like a router, firewall, computer, etc. such that such appliances become "physical security policy" aware and can affect the behavior of the network or IT systems or physical security systems to either enforce security policies or mitigate security risks.

What is further needed is a system that provides an integration platform to maintain physical security states and enforce rules in real time based on security system data and events and conversely affect the behavior of security systems based on rules defined on IT and network systems data, states and events.

BRIEF DESCRIPTION OF THE DRAWINGS

Embodiments are illustrated by way of example and not limitation in the figures of the accompanying drawings, in which like references indicate similar elements and in which.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Embodiments are directed to systems and methods for integration and normalization of physical security data, states and events from disparate physical security systems to maintain in real-time rules based policy state information to enforce physical security policies uniformly across network and information technology (IT) systems. Physical security systems include equipment and processes that implement physical security measures for incidents, access control, monitoring systems, lighting, security, audits, inspection, facility management, building automation, and the like. Embodiments pertain specifically to such apparatus for providing an integration platform, methods and processes for normalizing data from physical security systems, to maintain physical security states, mapping to network access and either directly affecting the network equipment through standard programming commands or providing interfaces for network equipment and IT applications to query and determine physical security access states thus enforcing rules in real-time based on security system data and events.

In the following description, numerous specific details are introduced to provide a thorough understanding of, and enabling description for, embodiments of an integrated physical security monitoring and control system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

Figure 1A:
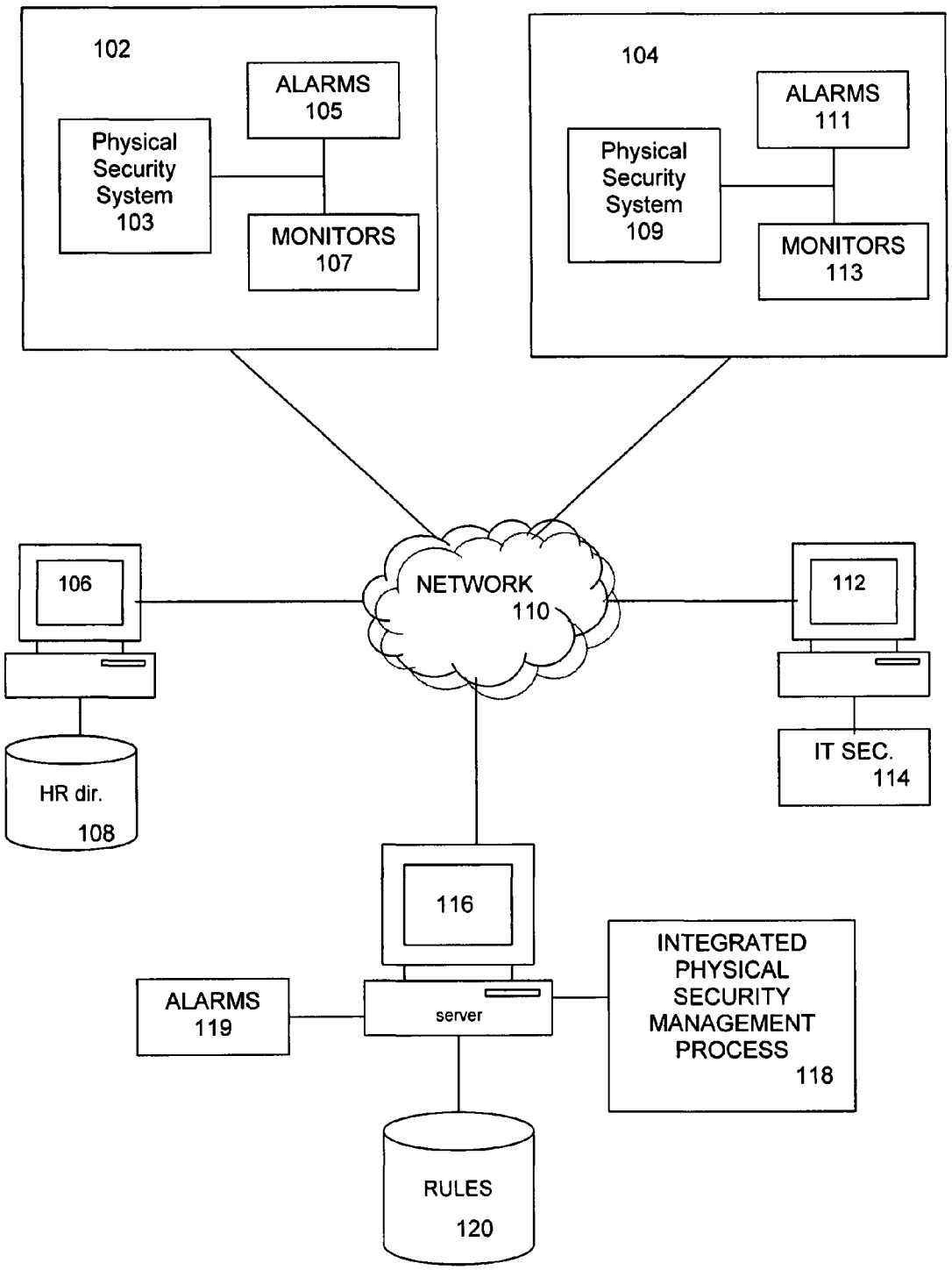
FIG. 1A is a block diagram of a computer network that implements an integrated policy-based physical security management system, under an embodiment.

Aspects of the one or more embodiments described herein may be implemented on one or more computers executing software instructions. Such computers are typically distributed among different facilities in a wide-area or even global-scale network that may be connected in a client-server arrangement or similar distributed computer network. FIG. 1A illustrates a computer network system 100 that implements one or more embodiments. In system 100, a network server computer 116 is coupled, directly or indirectly, to one or more network client computers or computing devices through a network 110. The network interface between server computer 104 and the client computers may include one or more routers that serve to buffer and route the data transmitted between the server and client computers, and network 110 may be the Internet, a Wide Area Network (WAN), a Local Area Network (LAN), or any combination thereof.

One or more of the network client computers may be deployed in a building or facility that is used by a business or as a residence, to control one or more computer-based physical security systems. Thus, as shown in FIG. 1A, facility 102 contains a physical security system 103 that controls security elements, such as alarms 105, and monitors and sensors 107. Facility 102 may represent a house or office building, or any other type of structure that contains some level of physical security infrastructure. The alarm and monitor elements of the physical security systems represent various access control, monitoring, surveillance, sensor, or other asset protection mechanisms that may be employed throughout the facility. These can be independent elements that are configured to detect and report different types of events, such as fire, gas leaks, intrusion, computer hacking, physical proximity, and any other similar type of event. Such systems can thus be used to control personnel access within a facility and to detect unauthorized access by inside or outside personnel, as well as to detect natural events, such as fires, earthquakes, etc. Detection of any such event can be used to alert proper officials and/or automatically invoke protection mechanisms, such physical shutdown, backup of computers, turning on lights, and so on.

In one embodiment, the physical security system 103 embodies physical access control systems (PACS) that allow access to physical facilities of an organization or entity (government, commercial, or private). These systems allow users to gain access to resources, location and assets of the entity through various access means, such as ID's, access cards, passwords, biometric data, and so on. In one embodiment, the physical security system 103 may be a managed physical security system (MPSS) that is managed by a standard policy-based software application to apply uniform corporate security policies. These can include any system that is employed for ensuring physical security of personnel and assets as well as monitoring of incidents and activity plus automation of building management and environment control systems.

Facility 104 represents another possible facility that includes its own physical security system 109 that controls respective alarm 111 and monitoring 113 subsystems. In general, the physical security systems deployed by each facility may be provided by different vendors and therefore produce data that is unique or proprietary. Indeed, even a system within a particular facility may need to deal with disparate types of data from the various alarms and monitors within the facility.

The physical security system 103 can be embodied in a client computer that is a workstation or personal computer (PC) class computer. Alternatively, such a system can also be implemented on any type of computing device or a mobile computing or communication device, such as a notebook computer, personal digital assistant (PDA), mobile phone, game console, or any similar class of mobile computing device with sufficient processing, communication, and control or AV (audiovisual) playback capability.

In one embodiment, server 116 in network system 100 is a server computer that executes an integrated physical security management process 118. This process generally comprises hardware and/or software components to achieve integration, normalization, rules creation and processing of physical security systems data and events in different facilities, such as facilities 102 and 104. The integrated physical security management process includes functional components that perform the tasks of integrating non-standard and proprietary data from disparate and numerous sensor, alarm and monitoring systems within and among different facilities. In one embodiment, the integrated physical security management process 118 includes a normalization process that normalizes of disparate security systems data to a standard data format, for example, access control and alarm data. It also includes processes to generate unique physical access credentials to provide an exclusive mapping between an individual's profile (job, department, location, and so on) and an organization's spatial hierarchy of its global physical security system deployments (doors, buildings, lockers, safes, and so on). For personnel control, the integrated physical security management process 118 is configured to generate unique physical access credentials based on individual profiles to automatically assign credentials across multiple global physical security systems to overcome certain limitations (e.g., memory constraints) of standard access control systems. The process stores and provides uniform access of cross system data in normalized form. For this embodiment, certain information regarding human resources (HR), such as organizational charts, privileges, passwords and so on may be provided by an external data source, such as data store 108 coupled to a separate server computer 106.

To facilitate creation and deployment, physical and IT (information technology) security systems are created through object stencils for use with visual policy editors. A central rules engine is included for the creation of standard rules and actions on physical security system data with visual policy editors generating a formatted rule (for example in XML format) for the rules engine. The process 118 allows for processing of rules in real-time to generate actions affecting access control systems and other integrated network and IT management systems or applications, and it provides rules-based workflows across integrated physical security, networking and IT systems. Where appropriate, the process 118 provides integration with industry standard systems to provide actionable event data. For this embodiment, certain information regarding the IT components (such as LAN and WAN network topographies, computer specifications, user names/passwords, and so on), may be provided by an external data source, such as data store 114 coupled to a separate server computer 112.

The application of the integrated physical security management process to IT applications is an important aspect of the overall integration feature of system 100. Information Technology includes many aspects of computing technology to serve the computing, communication and data storage needs of an organization. These include database systems and management, computer networking, software application, and management information systems. Thus, IT Systems span a variety of computers and computer software to convert, store, protect, process, transmit and retrieve information. Examples of IT systems include corporate directory servers that contain listing and information on an organization's users and other assets, and information from which can be obtained by other applications using various standard protocols such LDAP (Lightweight Directory Access Protocol). Another example are corporate data repositories, which include small to large database systems that contain various informational, transactional and audit data stored by various applications and users of the data, and human resources systems, which are applications and data repositories that contain corporate personnel information and data. IT systems also include e-mail servers, which are applications and servers that enable email communication, and web applications and servers that are made available to end-users through HTTP to be used with standard web browsers.

In one embodiment, the server computer 116 includes an optional World-Wide Web (WWW) server or server clustering environment that stores data in the form of web pages and transmits these pages as Hypertext Markup Language (HTML) files over the Internet 110 to the client computers. For this embodiment, the client computers typically run a web browser program to access the web pages served by server computer 116 and any available content provider or supplemental server, such as computers 106 and 112.

As shown in FIG. 1A, any of the processes executed on any of the client and/or server computers may also be referred to as modules or components, and may be standalone programs executed locally on the respective client computer, or they can be portions of a distributed client application run on the client or a network of client computers. Thus, the integrated physical security management process 118 may represent one or more executable programs modules that are stored within network server 116 and executed locally within the server. Alternatively, process 118 may be stored on a remote storage or processing device coupled to server 116 or network 110 and accessed by server 116 to be locally executed. In a further alternative embodiment, the integrated physical security management process 118 may be implemented in a plurality of different program modules, each of which may be executed by two or more distributed server computers coupled to each other, or to network 110 separately. Throughout the description, the terms, "module," "component," and "process" may be used interchangeably to mean an computer program, routine, or subroutine that is executed on any of the server and/or client computers of FIG. 1A, and may be implemented as software, firmware, or programmed hardware.

For an embodiment in which network 110 is the Internet, network server 116 executes a web server process to provide HTML objects, typically in the form of web pages, to client computers coupled to the network. To access the HTML files provided by server 116, the client computers execute web browser processes that accesses web pages available on server 116 and resources, such as supplemental server 106. The client computers may access the Internet 110 through an Internet Service Provider (ISP). Content for any of the programs or data associated with the physical security systems used by the client computer may be provided by a data store 120 closely or loosely coupled to any of the servers and/or each client computer. A separate content provider may provide some of the data that is provided to the integrated physical cal security management process 118. Although data store 120 is shown coupled to the network server 116, it should be noted that content data may be stored in one or more data stores coupled to any of the computers of the network, such as network client 102 or to devices within the network 110 itself.

Figure 1B:
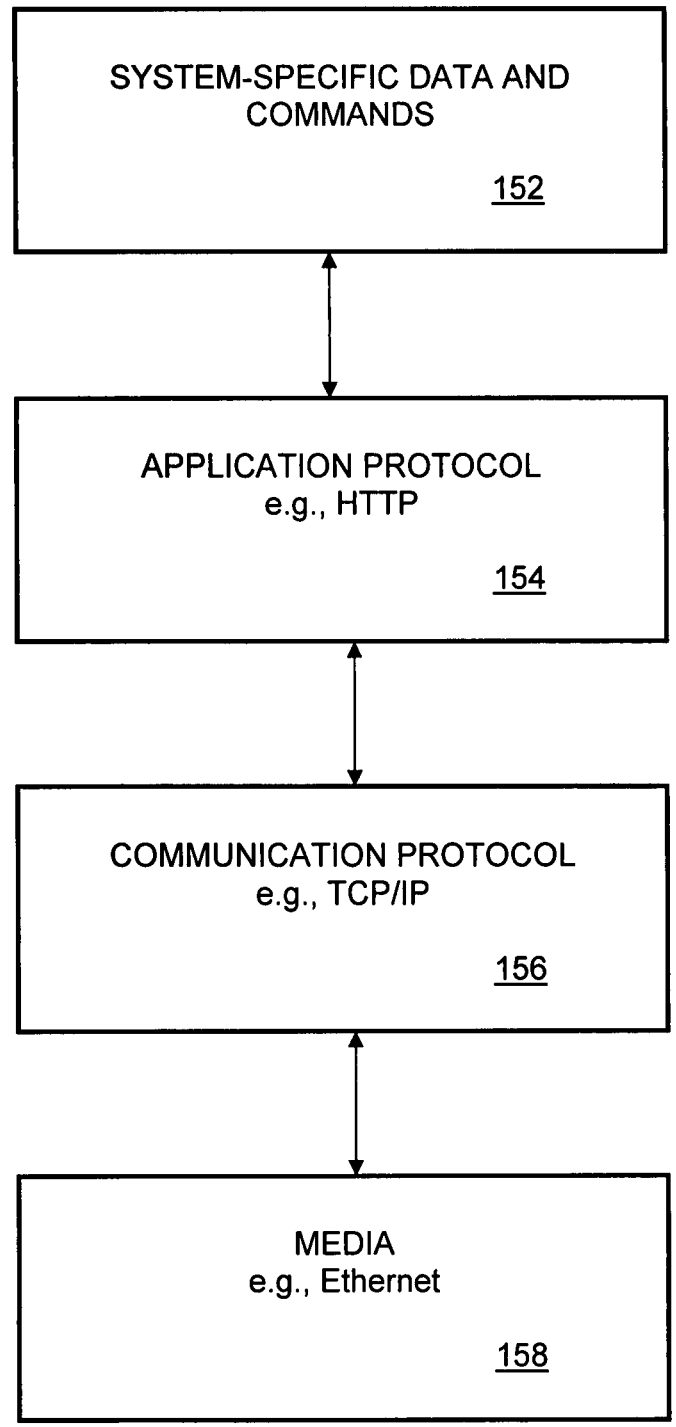
FIG. 1B illustrates an interconnection stack for integration of disparate physical security systems, under an embodiment.

The integrated physical security management process 118 interconnects and integrates with disparate physical security systems, normalizes the communication data, commands and events from these different systems into a common standard format. A management function provides a mode of visual representation of the normalized physical security systems, data and processes, and visual policy objects define the design time behavior for flexible and actionable rule creation. FIG. 1B illustrates an interconnection stack for integration of disparate physical security systems, under an embodiment. In general stack 150 represents layers in a network system that includes dedicated devices, software systems and applications that are responsible for internetworking, configuration, management and monitoring of computer networks. These systems perform various functions as defined by the Open Systems Interconnection (OSI) model of ISO (international Standards Organization) and ITU (International Telecommunication Union). Internetworking devices support different media interfaces and communication protocols and connect different computing systems as well as other peer devices to create a wide variety of local area networks (LAN) and wide area networks (WAN) such as the Internet. These devices include hubs, switches, bridges and routers that connect various segments of a network. These systems are based on standard protocols for network communication at the media (wire) level, including: LAN/Ethernet—defined by IEEE 802.3, Wireless LAN (WiFi)—defined by IEEE 802.11, ATM (Asynchronous Transfer Mode), TCP/IP (Transmission Control Protocol/Internet Protocol), UDP (User Datagram Protocol), ICMP (Internet Control Message Protocol), OSPF (Open Shortest Path First), RIP (Routing Information Protocol), and IPSec (IP Security). Network services systems include network equipment and applications that provide services used by end-users and/or other computing systems. Such application protocols for services include: VoIP (Voice over Internet Protocol), RoIP (Radio over Internet Protocol), HTTP (Hypertext Transfer Protocol), FTP (File Transfer Protocol), SMTP (Simple Mail Transfer Protocol), POP3 (Post Office Protocol version 3), DNS (Domains Name System), VPN (Virtual Private Networking) that is used to securely tunnel a corporation's network traffic through various networks. Additionally, there are software applications that complement the network devices by providing functionality for configuring the network and also monitoring the network for alarms and performance. These systems are based on standard protocols for configuration and monitoring, these include: SNMP (Simple Network Management Protocol), CMIP (Computer Management Information Protocol), and OSS (Operations Support Systems). The process 118 takes system specific data and commands 152 and conforms them to the appropriate application protocol 154, communication protocol 156, and the media 158 layers.

The integrated physical security management process 118 includes multi-communication, media and application interfaces to connect with disparate, multi-vendor and distributed physical security systems as well as software applications and networking systems. An integration layer contains agents and adapters with built-in intelligence for multiple physical security systems and supports extensibility through mapping of application protocols, command and data 152 formats for integration with new and emerging physical security systems. It also normalizes the communication data, commands and events from the disparate physical security systems to a common standard format. This common representation can be used by applications, rules engines and other standard software components, while still maintaining communication to the respective physical security systems, applications and devices in their native, proprietary format. This eliminates the need for the customer to perform costly replacements in order to achieve rules bases integration and interoperability.

Figure 2:
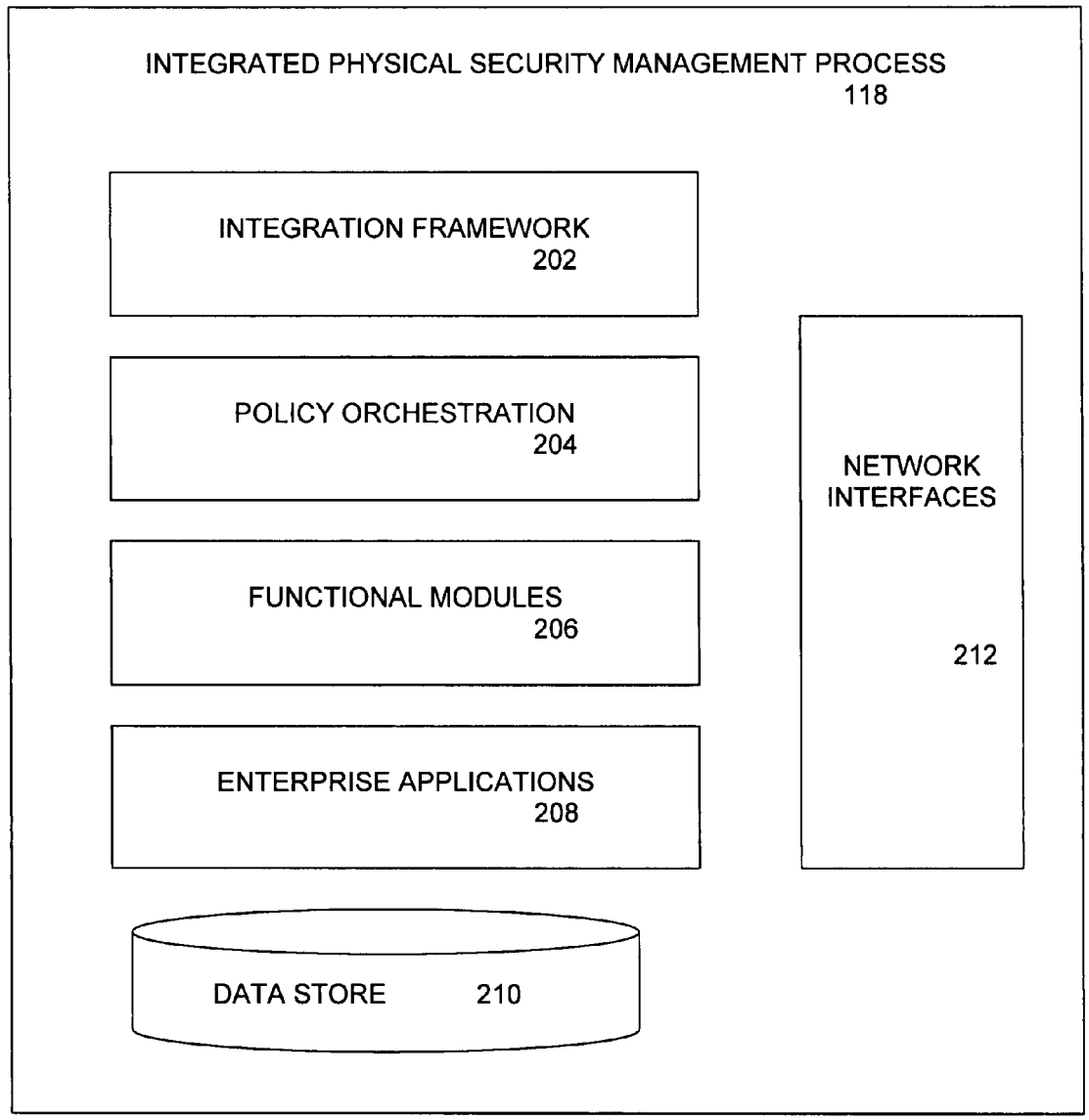
FIG. 2 is a block diagram that illustrates the major components of an integrated physical security management process, under an embodiment.

In one embodiment, the integrated physical security management process 118 includes a number of constituent modules that normalize security system data, create policy rules and process the data and events of physical security systems. FIG. 2 is a block diagram that illustrates the major components of an integrated physical security management process, under an embodiment. As shown in FIG. 2, integrated physical security management process 118 includes an integration framework component 202 that provides certain processes to interconnect physical security systems to an orchestration and policies module 204. The integration framework 202 supports different transport protocols and can be configured to interconnect disparate systems through standardized system and data mapping definitions. Once connected the systems receive and send data and events to each other normalized through policies that are based on the rules defined by the system. The policy orchestration component defines processes to describe the data and event mapping and transformations between physical security systems and data stored in a system data repository, as well as other network or IT systems.

The system policies are defined on normalized data and events using a visual policy editor. The system provides embeddable software objects and processes to enable drag and drop capability for policy creation on physical security and other systems connected through the integration framework 202. In one embodiment, system policies are described in standard XML (Extensible Markup Language) that is loaded on the rules engine. At run time the rules engine enforces the rules on the access control data and events passing to and from the systems connected through the integration framework 202. The rules engine controls the persistence and distribution of physical access changes as well as correlates security events to create actionable alarms and alerts for management applications, supervisory staff or physical security, network or IT systems. The defined policies can, furthermore, connect to systems of record for data verification and rules enforcement in real-time. For example, corporate directory services, such as provided by data store 108, can be used to verify the authenticity of a person, requesting access to a building through a physical security system.

The integrated physical security management process 118 includes one or more functional modules 206. These functional modules are web-based modules that utilize the services provided by the underlying core functionality of integration and policies, primarily to configure and view integrations between systems, visually create and edit policies enforced by the system, report and edit personnel data, view alarms, and alerts and policy actions through configurable reports, among other similar functions. Process 118 also includes one or more enterprise applications 208 serving various business functions. These can be flexibly built using the functional modules 206 by adequately trained software professionals managing physical, network and IT security software applications. A data repository or data store 210 provides the normalized definitions (schema), audit trail and persistence of data and events from across multiple, disparate security, network and IT systems. The data store maintains a record of all changes received and propagated, and in one embodiment utilizes industry standard data warehousing technologies.

The integrated physical security management process 118 of FIG. 2 also includes network interfaces component 212. This component is configured to maintain physical security access information and states within a site by maintaining access information per individual or group defined in the security systems in real-time. Events communicated from security systems are captured by the system to maintain dynamic states of access permissions and real time actual physical access. Similarly, events communicated by the physical security systems are processed to maintain alarm and alert status for physical locations and individuals or groups which is then correlated to physical security access permissions and real-time access records.

The network interfaces component includes a network command and query interface that allows querying of security state information by network and IT equipment in real-time to affect network data transmission and IT applications access in real-time. The physical security services can directly affect the data flow on interconnected network equipment through the issuance of control commands mapped in real-time from physical security states. Commands and events generated by the network interface can alternatively be sent to network management applications which in turn manage network equipment globally.

In one embodiment, the integrated physical security management process 118 incorporating network interfaces 212 processes physical security data and events by a physical security service (PSS) module to maintain physical security infrastructure state in real-time. This generally provides real-time availability of physical security states to network equipment or software applications for affecting data flow on network equipment or controlling behavior of software application in compliance with security policies. The PSS module is implemented directly on the network equipment in the form of software module, dedicated hardware module connected through common device backplane or discrete network equipment, or similar implementation. It is integrated with, and receives physical and network security access privilege definitions from physical, network and IT security systems in the specific formats of multiple vendor systems and normalizes these definitions to a standardized form. The PSS module interfaces with physical security systems directly over multiple communication interfaces and protocols such as serial communication or Internet Protocol (IP) to receive physical security system data and event transmissions in real-time. It processes physical security system data and events in real-time to build active access lists and states for physical access control systems and provides standardized mapping of physical security states and events to network equipment policies for network traffic. The PSS is configured to apply physical security states of access control, privileges and events to network equipment data transmission policies thereby controlling the data flow. Policies are applied through standard or network equipment specific configuration management and provisioning interfaces. It also provides standard interfaces for network and IT equipment to subscribe to or query in real-time physical security states and policies from the PSS module.

In one embodiment, the PSS module is configured to directly extract physical security data and events from network traffic to build physical security states. It receives network data packets bearing physical security systems data and events directly from integrated or connected network equipment, and handles the configuration and mapping of physical security system data and event sources to packet transmission policies on network equipment, and applies the system-defined policies to desired network equipment to receive physical security system events directly for processing. In this manner, the overall process 118 can map, correlate and apply, in real-time, uniform physical and network security policies to network data.

Figure 3:
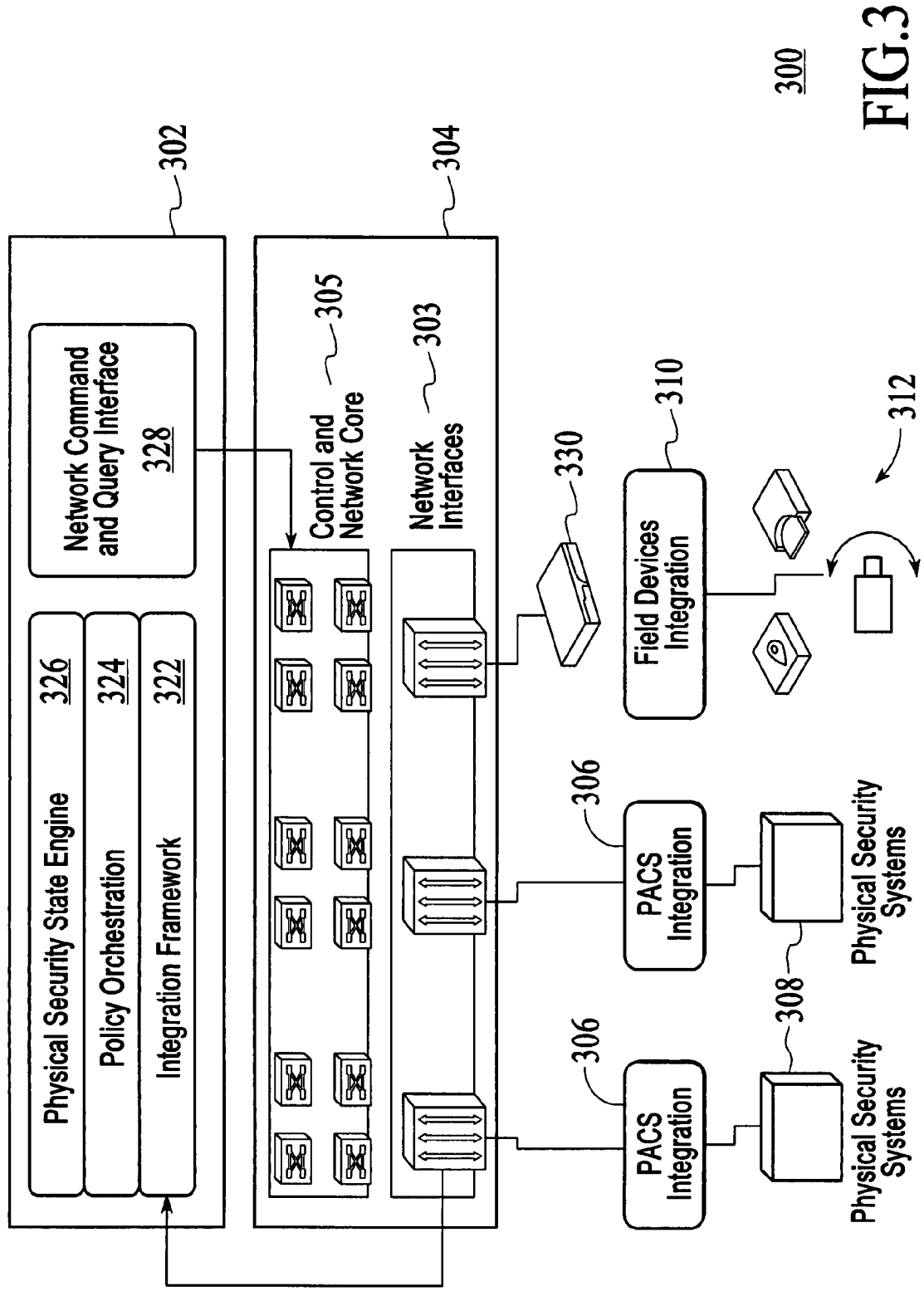
FIG. 3 is a block diagram illustrating the logical architecture of a physical security service module, under an embodiment.

FIG. 3 is a block diagram illustrating the logical architecture of a physical security service module, under an embodiment. In general, the PSS module 302 of system 300 includes several components, such as an integration framework 322 within a physical security module 302 that is responsible for receiving the physical security systems data and events in multi-protocol, multi-vendor format. This data is then normalized and standardized to build and maintain state information based on system-defined policies and rules. The different data protocols handled by the integration framework 322 can include governmental physical access control protocols. A physical security policy orchestration component 324 examines and processes all physical security data and events in order to apply the configured rules. The rules determine the action to be taken and eventually the state that should be maintained for all physical security access and events. FIG. 3 illustrates typical network equipment modules and functions, and the embedded co-residency of the PSS module on network equipment software platforms as well as the interface with network equipment functions. The network equipment layer 304 includes network interface elements 303 on network equipment. These interfaces serve to receive and send data from other connected network systems and applications. The network equipment 304 contains core network control functions 305 and interfaces of a networking device. Internal details are specific to network equipment type and vary depending upon system configurations. For example, command interfaces provided by the network control functions of the network device to program access control permissions change the rules for data transmission, and so on.

In one embodiment, a PSS module 302 is embedded, implemented or deployed as a software or hardware module on the network equipment itself. The PSS module includes an integration framework component 322 that is responsible for receiving the physical security systems data and events in multi-protocol/multi-vendor format that is normalized and standardized to build and maintain state information based on policies and rules. It is also responsible for similarly receiving the rules and configuration information from policy management systems through the network interfaces 303. Network equipment can be configured to route physical security related data traffic to integration framework component 322 so that it can be suitably processed. A policy orchestration component 324 examines and processes all physical security data and events in order to apply the configured rules. The rules determine the action to be taken and eventually the state that should be maintained for all physical security access and events. Rules-based event and data correlation results in actionable state information for IT, network and other security systems. The physical security state engine 326 within the PSS module 302 is the real-time, high speed repository and access interface to all the security states defined in the system. Physical security states correlate physical security system data and events to access permissions for individuals, groups, corporate, geographical or other defined domains on the network, applications or other secured IT or physical assets.

A network command and query interface 328 within PSS module 302 is responsible for mapping physical security states to network and applications operational characteristics to grant, deny or restrict access. Network and IT systems can query the interface on demand to obtain the latest states information and resultant actions affecting security privileges. Alternatively, the system can be configured to interface directly with the network modules and relay commands or data that result in the desired change for security access to network or applications.

System 300 illustrates several possible connectivity options with physical security systems 308. Physical security systems that rely on proprietary means of communication media and data formats for access control data and events are connected over the network through integration modules 306 and their data is normalized by the integration framework component 322. Physical security systems that are IP enabled and can communicate data and events directly over Internet Protocol transmission. Physical access control elements 312, such as door controllers, readers and video cameras, are connected to the network interfaces component 303 through a field devices integration module 310. Further interface to the system can be provided by a dedicated management apparatus 330.

Figure 4:
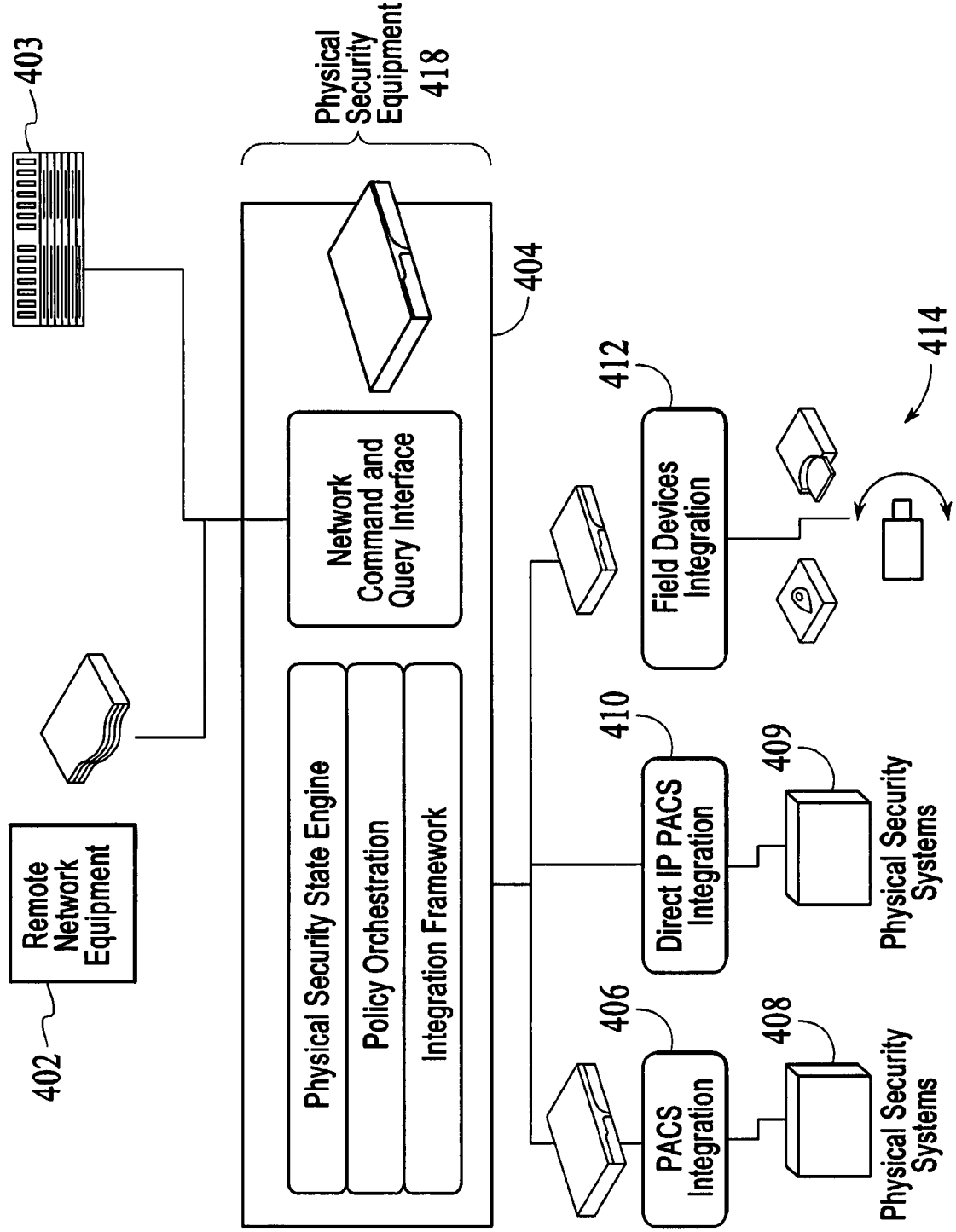
FIG. 4 is a block diagram that illustrates the logical and deployment architecture of a PSS module on security equipment with command and query interfaces to the network equipment.

FIG. 4 is a block diagram that illustrates the logical and deployment architecture of a PSS module on security equipment with command and query interfaces to the network equipment. As shown in FIG. 4, remote network equipment 402 or applications that can either register for, and receive, physical security states and actions based on physical security system data and events or be directly controlled through defined command interfaces by the PSS module which is operational on discrete equipment. The actions generated from SPS3 affect the behavior of data flows and application access as controlled by the network equipment thus connected. The PSS module 404 includes the components of an integration framework, policy orchestration, state engine, and network command and query interface deployed on discrete network equipment 418 maintaining physical security states and performing the functions as described above with reference to FIG. 3. This includes the ability to interface with physical security systems 408 and 414 and control or respond to queries from network equipment and IT applications. Queries and commands are transmitted between the external network equipment and applications 402 and 403 to the network command and query interface component of the PSS module 404.

As shown in FIG. 4, the PSS modules are coupled to separate physical security services equipment 408 through integration components 406, or direct IP integration 410 in the case of IP enabled security systems 409. Physical access control elements 414, such as door controllers, readers and video cameras, are connected to the network interfaces component 404 through a field devices integration module 412.

In one embodiment, the integrated physical security management process 118 includes a system orchestration framework layer that integrates and routes data from disparate and distributed physical security systems. The data and events are received in the native format of the individual systems, such as lighting/control devices, access readers, door controllers, infrared sensors, card readers, and personnel access control systems (e.g., Lenel OnGuard, C*Cure, AMAG, etc.) and physical security protocols (such as BACnet, oBIX, etc.). Basic sensor or agent data is transmitted through corresponding agents or interfaces, and various web-based or proprietary HR resource protocols can be handled by OEM (original equipment manufacturer) adapters. All of the disparate data is routed to the integration layer of the system orchestration framework, which is configurable to support the multiple physical media, network protocol and data formats that can be used to integrate with various systems. Additionally, data changes and events can also be received from networking systems and IT applications.

In one embodiment, the data and events received from various systems are aggregated in accordance with defined data mapping and translation schemes. This normalizes the data and events into standardized format that enables processing by the policies and persistence in the data repository. Similarly, physical security events, actions and data generated or propagated through the system to various physical, network and IT security systems is normalized and standardized to formats recognized by the respective systems.

The policy orchestration framework layer within block 404 works to pass the physical security related data (for example, personnel credentials and access privileges) and events (for example, alerts) from physical security systems, network and IT applications to the system for processing. A workflow module then applies relevant transformation and routing rules to the events and data to generate action events (for example, alerts, emails or SNMP alarms) on the physical security related actionable data (for example, personnel credentials and access privileges).

In one embodiment, the integrated physical security management process provides a normalized physical security integration environment in which rules can be created to uniformly address the following main types of entities: physical security systems and devices (e.g., PACS and sensors), data (e.g., users, access, events, commands), and processes (automated cross-checks, schedules, reference lookups, approvals, and notifications). Visual rule building-block objects are created in a data model to represent the normalized physical security systems/devices, data and processes. The representation of the systems and data includes the data mapping, formatting, hierarchical (and other) relationships and the commands specific to the individual types of systems. This includes not only the physical security systems but other source applications as well as consumers of the data, events and commands that can be either received or generated from the system. The representation of the processes includes mapping and attributes to support the ability to design security operations related workflows which can include cross-checks, references and interaction with users, applications and other systems. The visual rule objects contain attributes that define their spatial relationship to other building blocks that are used to represent normalized systems, data and processes. Such building blocks are also referred to as stencil shapes or live objects." The rule objects represent normalized systems, data and events and reference back to the data repository, even during design time to provide data lookups and references related to the rule relationship being created. Thus each object exposes rule attributes and allows the user to define values during design time that are to be used during rule execution. A rule object's attribute values can be a) specific (entered manually or looked-up from real values during design time) b) wildcards or c) implicit (obtained from the lookup of an external system during rule execution time or from the incoming data). For example, if the rule shows person credentials being received from a Corp HR Directory (e.g. using LDAP protocol) and the person's role being checked to provision into a Lenel type of physical access control system—then, the user who is designing the rule would only see Person attributes AND possible values related to the normalized representation of the HR system thus creating a convenient, effective system of rule creation. This is done through real-time communication of the design time front end visual editor to the backend data repository, normalized system and rules definitions. As the rule is created using a visual policy editor using drag and drop graphical user interface techniques, interconnection of rule objects and setting their properties the user is guided through the creation as well as the rule design validated in real-time before finally being saved and pushed to the rules engine for execution. The rules engine is a software module that applies the defined rules on the data transactions processed by the system.

The rules engine is a software module that applies the defined rules on the data transactions processed by the system. A policy is a user-defined logical entity that acts as a container for rules that are contained in the policy definition. An administrator typically creates a policy and then adds rules to the policy. Multiple policies can be created in the system. Policies are logical entities that allow easy grouping of rules in order to understand, view, enable and order them as one group. Rules are the actual lowest level combination of Condition-Action that is applied to the data objects processed by the system. The policy manager applies one rule at a time to the data passing through the system.

Figure 5:
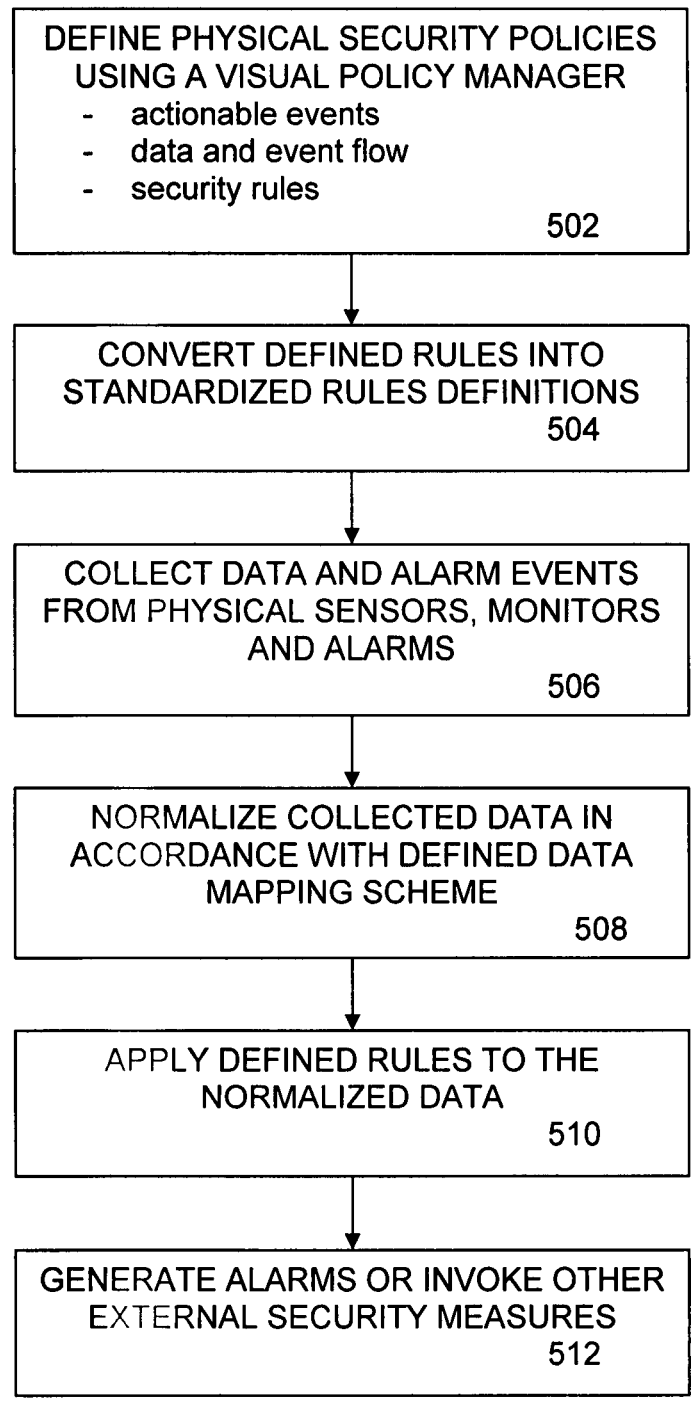
FIG. 5 is a flowchart that illustrates a method of creating rules and processing source security data in an integrated physical security management process, under an embodiment.

FIG. 5 is a flowchart that illustrates a method of creating rules and processing source security data in an integrated physical security management process, under an embodiment. Physical security policies are first defined using a visual policy manager, block 502. In one embodiment, this is a GUI (graphical user interface) driven process that allows a user to define event objects representing actionable events, data objects representing personnel and/or assets, and rules controlling the interactions among the events and the objects. The defined rules are then converted into standardized rules definitions based on a standardized format, such as XML, block 504. The system collects data and alarm events from physical sensors, monitors and/or alarms distributed throughout the monitored facilities, such as facilities 102 and 103 in FIG. 1A, block 506. This data is collected in native format and then aggregated and normalized in accordance with defined data mapping and translation schemes, block 508. This formats the data and events into a format to enable processing by the defined rules. These defined rules are then applied to the normalized alarm and event data, block 510. The rules can cause any number of internal or external actions to be taken, block 512. Although embodiments are directed to the use of XML, it should be noted that other standards are also possible, such as ODBC (Open Database Connectivity) JDBC (a Java application programming database), and RDBC (relational database management system), among others.

The external responses of block 512 can be configured depending on the requirements and constraints of each monitored facility. These include the generation of audible alarms, notification of authorities (e.g., fire, police, medical), notification of company personnel (e.g., security officers, corporate officers, IT managers). In the case of physical intrusion, the system can be configured to physical shutdown areas of the facility or implement any type of lockdown mode to prevent further access or escape from any intruder. In the case of an IT intrusion event, the system can be configured to shutdown computer resources to prevent access, and in the event of a physical catastrophe, such as fire or earthquake the system can be configured to initiate automatic computer backup procedures or open fire escape doors and provide illumination, and so on.

Figure 6A:
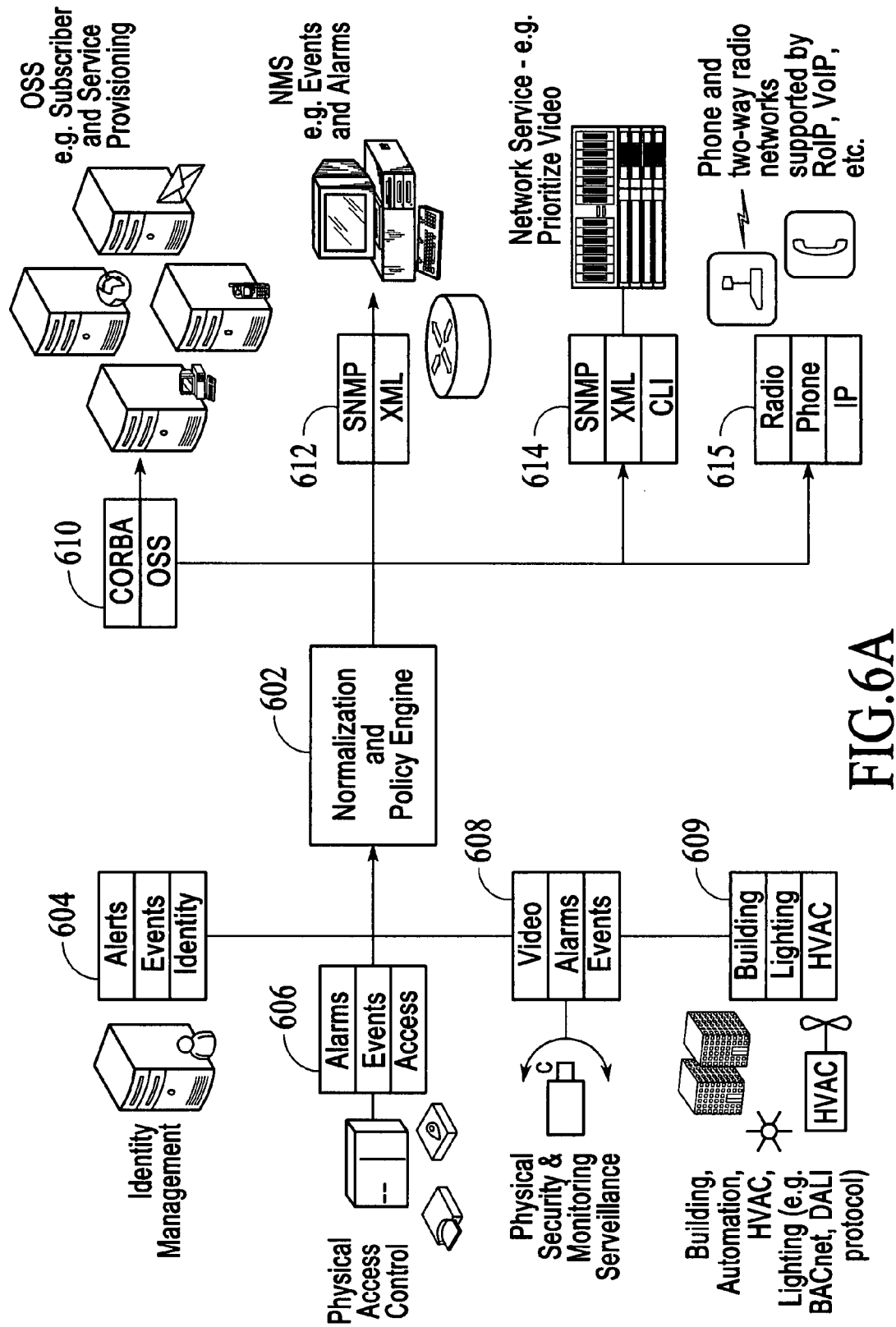
FIG. 6A illustrates the integration of physical security to network systems, under an embodiment.

As shown in FIG. 4, the PSS module is integrated directly into physical security equipment. FIG. 6A illustrates the integration of physical security to network systems, under an embodiment. FIG. 6A illustrates an example of normalization, processing, correlation and integration of various physical security systems' commands, events, messages and alarms with network systems. Examples of physical security systems include, but are not limited to: identity and credentialing systems 604, Physical Access Control 606, management and monitoring systems based on physical surveillance events, alarms and video 608, and building automation and management 609. Examples of networking systems include, but are not limited to: subscriber and services provisioning systems 610 for provisioning users as well as granting them special services access or enabling disabling network services as per corporate policies, network management systems (NMS) 612 for centralized alarm monitoring, responding to physical security events and applying policies for the protection and availability of critical network resources. Other networking systems include network services 614 network services configured to prioritize network traffic and automatically respond to security events, and radio/phone/IP communication systems 615. The data, objects, and events for the networking systems and physical security systems are all integrated within the normalization and policy engine 602 for the normalization of data and the application of defined rules to perform specified functions. For example, fire sensors can inform operators to start remote backups, network and IP services systems that can be directly controlled to prioritize traffic and auto respond to security events. In this case, the data from the physical sensors is normalized to conform to the system and the applied rules effect the desired response.

Figure 6B:
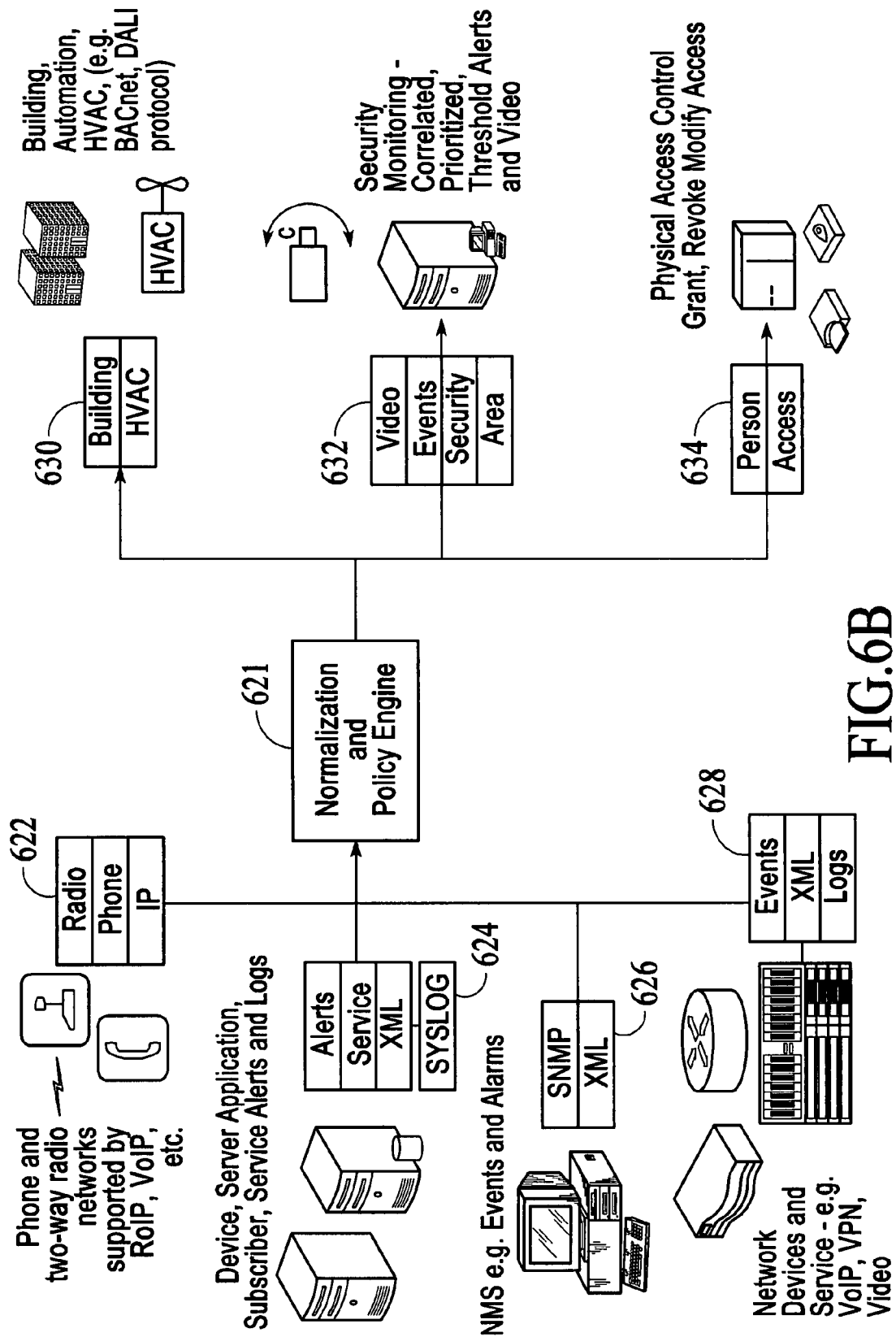
FIG. 6B illustrates an example of normalization, processing, correlation and integration of network system events in physical security systems.

FIG. 6B illustrates an example of normalization, processing, correlation and integration of various network systems' events, messages and alarms to commands, alerts and actions in physical security systems, under an embodiment. Examples illustrated in FIG. 6B include, but are not limited to common workplace scenarios where an event or an alert in a networking system is either the result of a physical security event or needs to be handled by physical security systems/personnel in order to protect corporate assets (personnel, infrastructure or materials). The system can be configured to alert the administrator to unusual systems, application or services behavior, such as IP traffic on ports of executive offices at night, abnormal downloads from office of worker on leave/vacation, application performance degradation at unexpected times could be the result of intrusion and investigated by physical security. Other conditions include alerts and alarms from network monitoring systems, such as an SNMP high temperature trap coming from network devices could be correlated and fed to a security manager's console who can view the environment control system settings as well as view the correct live video feed to rule out a larger threat to the systems/buildings.

As shown in system 620, the normalization and policy engine receives signals from radio/phone/IP communication systems 622, device service alerts and logs 624, NMS events and alarms 626, as well as network devices and services 628. The data from these sources is normalized, the defined rules are applied, and control signals are then output to various control systems, such as building automation 630, security monitoring systems 632, and PACS systems 634.

Network System Examples

An example installation of the PSS module is a network management system (NMS), which provides the framework and applications that are used by network managers to configure and monitor large enterprise network infrastructure. A commonly used model and framework aptly described the functions performed by NMS and their operators. A Fault, Configuration, Accounting, Performance and Security (FCAPS) component of network devices and systems correlates to the OSI model for design and intercommunication of telecommunications and network systems. These functions are performed by the Network Management Systems using standard management information (MIB) provided and protocols supported by various network devices, systems and even applications. Systems can communicate fault, configuration, accounting, performance and security events using different standards based protocols defined by the industry and standards organizations. Examples include, Simple Network Management Protocol (SNMP), Common Management Information Protocol (CMIP), Command Line Interface (CLI), Syslog, XML and TLV formats etc.

Operations Support Systems (OSS) are used in telecom and networking to manage the data, processes, services and related applications. The term most often refers to the systems that are used to manage the access and core elements of the network in order to provide services to the end-users (or subscribers). One such example is the provisioning/de-provisioning of subscribers for access to common network services such as a) Cellular wireless b) Enterprise VPN and c) DSL or Cable Internet access. Subscriber Management Systems and Billing (or Business) Support Systems are also similar functional subsets of OSS systems. Protocols and standards have been defined by industry consortiums and standards bodies for applications and network systems. These standards and protocol example includes, OSS/J, CORBA (Common Object Request Broker Architecture) and Command Line Interfaces (CLI) offered by various network equipment vendors. Network or IP Services loosely refers to an array of subscriber and application oriented services based on capable network devices and protocols. More specifically, this refers to the capability of the underlying network devices and systems to offer these services in a highly configurable and manageable manner to suit a variety of subscriber needs, options and service level agreements. Examples include Quality of Service (QoS), Differentiated Services (DiffServ), Traffic Shaping, Policing, Accounting, Service Level Agreement (SLA), Firewall, VPN etc. for Voice, Video and Data. Present physical security systems typically lack the capability to influence the state of network systems based on changes in the subscriber's or enterprise's business security environment. Similarly, they lack standards based integration to be affected by the state of the network systems. Thus, the two critical systems in an enterprise—network and physical security have traditionally operated in their own hard-walled silos.

In one embodiment, the PSS module of the integrated physical security system 118 supports rules based integration of physical security systems with network systems. This is possible through the integration layer that has support for disparate technology based physical access control systems and the components that support network protocol and management interfaces out of the box. Mapping of data, commands, operations and processes is done through the policy manager for events and data flowing from either physical security systems to network systems or vice versa. The system normalizes physical security messages and the policy manager translates various conditions into commands, messages, alarms or network calls in order to convey the state or alter behavior of the networking system.

Following are certain examples of network protocols that the PSS module can utilize in order to receive events or send commands/events to networking systems.

SNMP Alarm Event (Trap):

The following example defines an alarm (Trap in SNMP terminology) which is generated by a network device (system or application) containing details in the objects defined in it. The receiving party uses information such as this to understand the format of the data received in the trap and thus create actions and rules to respond to it.

```
devPortAlarmNotification NOTIFICATION-TYPE
    OBJECTS {
        devTrapPortAlarmId,
        devTrapSlotId,
        devTrapCardType,
        devTrapPortId,
        devTrapOccurClearTag,
        devTrapIPAddress
    }
    STATUS current
    DESCRIPTION
        "The notification signal the agent detects an alarm status
        in the port."
    ::= { devMIBNotification 4 }
```

Syslog Format:

Syslog is a method to collect messages from devices to a server running a syslog daemon. Logging to a central syslog server helps in aggregation of logs and alerts. Network vendor's devices can send their log messages to a SYSLOG service.

```
Aug 08 10:24:07 server1 radiusd [643188]: [1]:
ACCOUNTING-START - sending
Accounting Ack to User [user_id1]
Aug 08 10:03:56 server1 radiusd [389278]: [1]:
User-Name = "user_id1"
Aug 08 10:03:56 server1 radiusd [389278]: [1]:
NAS-IP-Address = 10.0.10.10
Aug 08 10:03:56 server1 radiusd [389278]: [1]:
Client IP = [10.0.10.10]
Aug 08 10:03:56 server1 radiusd [389278]: [1]:
Framed-Protocol = PPP
Aug 08 10:03:56 server1 radiusd [389278]: [1]:
Message-Authenticator successfully
verified
Aug 08 10:03:56 server1 radiusd [389278]: [1]:
Authentication request for
[client1.sjc.quantumsecure.com]
Aug 08 10:03:56 server1 radiusd [389278]: [1]:
LDAP user id: user_id1.
Aug 08 10:03:56 server1 radiusd [389278]: [1]:
LDAP max_login_cnt:2.
Aug 08 10:03:56 server1 radiusd [389278]: [1]:
LDAP type: 4.
Aug 08 10:03:56 server1 radiusd [389278]: [1]:
LDAP passwordexpired: 0.
```

Service and Accounting Log:

The following are examples of accounting log entries created by a networking system for subscriber activity. Accounting log activity can be defined for various events in the system—especially pertaining to the usage of a service such as ATM, Firewall, VPN, security services, and so on.

Time Stamp: Tue Aug 07 14:24:53 PDT 2007 Log ID: 46053 Area ID: 1 Device ID: 4 ISP ID: 6 Subscriber ID: 21 Subscriber Instance: 4 Type: Admin Info: Session Started Time Stamp: Tue Aug 07 16:39:06 PST 2007 Log ID: 10 Area ID: 1 Device ID: 1 ISP ID: 2 Subscriber ID: 635 Subscriber Instance: 4 Type: Statistics Info (Pkts/bytes): [0] In #/# Out #/# [1] In #/# Out #/# [2] In #/# Out #/# . . . .

CORBA, OSS/J API:

Common Object Request Broker Architecture (CORBA) based application programming interfaces (API) are provided by many networking systems to allow creation of applications that can perform a variety of operations, administration, management, and provisioning (OAM&P) functions. Interface Description Language (IDL) is used to define the object-level interface of the API. This object interface includes the XML descriptions and documents that are used in a particular system vendor's environment.

void addServicesProfile (in string profileName, in string ispName, in string TservicesProfile servicesStruct) raises (svcException);

Similarly, OSS/J (OSS through Java) is part of the TM Forum to standardize the Java based XML and Web Services APIs used for integrating systems in the telecom and networking services infrastructure (delivering the services to the customers) and systems in the business (OSS) infrastructure.

Command Line Interface:

The following are examples of command line interface commands exposed by many networking systems that allow other applications to add, modify and delete network elements, subscriber entities and modify their usage of network resources and applications.

```
add subscriber [subscriber=]<subscribername>
   [domain=<domainname>]
   [isp=]<ispname>[scope=<scopename>]
   [account={off,radius}]
   [type={normal,wild,auth,noauth,bridge,ipdemux}]
   [subid=< subid>] [ispid=<ispid>]
   [radprof=<radprof>]
   [vpn=<vpnname>] [sgroup=<grpname>]
   [ipdemux=<ipdemux>]
   [alloc_method=<alloc_method>]
   [pool_name=<pool_name>]
   [backup_intf={enable, disable}]
set subscriber services [subscriber=]<subscribername>
   [domain=<domainname>]
   [isp=]<ispname> [[svc=]<svcname>]*
modify vpn [isp=]<ispname> [vpn=]<vpnname>
   [profile=<ipsecproflist>]
   [tracking=ikepeer][dscopy={true,false}]
   [dscp=<dscodepoint>] [bgp={enable,disable}]
```

BACnet Message:

BACnet is a data communication protocol for Building Automation and Control Networks. BACnet is an American national standard, a European standard, a national standard in more than 30 countries, and an ISO global standard. BACnet, is most popular standard communications protocol for the HVAC & Building Automation controls industry, is clearly becoming the accepted alternative to the proprietary communications solutions that to-date have dominated most HVAC controls installations. The following example illustrates BACnet messages as they might appear on an ARCNET or BACnet Point-to-Point (PTP) link. The examples describe the derivation of the encoded values from the service definitions and encoding rules contained in ANSI/ASHRAE 135-1995, the BACnet standard. In the example which follows, the network header specifies a global broadcast (DNET 0xffff, DADR of length 0). The network header contains no source network or address for the requester, as the requester is assumed in this example to reside on the same ARCNET network where the request is observed. The CRC is not shown, as it is inserted and removed by the ARCNET interface hardware.

| ARCNET REQUESTER sends | |
|---|---|
| 0x15 | ARCNET Source ID (assume hex 15) |
| 0x00 | ARCNET Destination ID (broadcast) |
| 0x0C | ARCNET Frame Length = 12 |
| 0xCD | ARCNET System Code for BACnet |
| 0x82 | 8802-2 SSAP (reserved by the IEEE for BACnet) |
| 0x82 | 8802-2 DSAP (reserved by the IEEE for BACnet) |
| 0x03 | 8802-2 caution: UI |
|  | NPDU follows |
| 0x01 | Network version 1 |

| -continued | | |
|---|---|---|
| 0x20 | Network control octet | |
|  | Bit7 = 0 | "BACnet APDU" |
|  | Bit6 = 0 | not used |
|  | Bit5 = 1 | DNET present |
|  | Bit4 = 0 | not used |
|  | Bit3 = 0 | SNET not present |
|  | Bit2 = 0 | no reply expected |
|  | Bit1, 0 = 00 | normal priority |
| 0xFF | DNET 0xFFFF (broadcast) | |
| 0xFF |  | |
| 0x00 | DLEN 0 (denotes broadcast) | |
| 0xFF | Hop Count 255 | |
|  | APDU follows | |
| 0x10 | APDU type 1: Unconfirmed Request | |
| 0x08 | Service Choice 8: Who Is | |
|  | No Tagged Service parameters for this example | |
|  | PTP BCU sends ComplexACK | |
| 0x55 | Preamble | |
| 0xFF |  | |
| 0x03 | Frame Type 3: Data 1 | |
| 0x00 | Length = 28. | |
| 0x1C |  | |
| 0xB0 | Header CRC | |
|  | NPDU follows | |
| 0x01 | Network version 1 | |
| 0x28 | Network control octet | |
|  | Bit7 = 0 | "BACnet APDU" |
|  | Bit6 = 0 | not used |
|  | Bit5 = 1 | DNET present |
|  | Bit4 = 0 | not used |
|  | Bit3 = 0 | SNET present |
|  | Bit2 = 0 | no reply expected |
|  | Bit1, 0 = 00 | normal priority |
| 0x00 | DNET 0x0002 | |
| 0x02 |  | |
| 0x01 | Destination address length 1 octet | |
| 0x15 | DADR 0x15 | |
| 0x00 | SNET 0x0001 | |
| 0x01 |  | |
| 0x01 | Source address length 1 octet | |
| 0x01 | SADR 0x01 | |
| 0xFF | Hop Count 255 | |
|  | APDU follows | |
| 0x30 | APDU type 3: Complex ACK | |
| 0x00 | Invoke ID 0 | |
| 0x0C | Service Choice 12: Read Property ACK | |
|  | Tagged Service parameters follow | |
| 0x0C | Context Tag 0, length 4: Object Identifier | |
| 0x00 | Data: Object type 0 (Analog Input), Object Instance 1 | |
| 0x00 |  | |
| 0x00 |  | |
| 0x01 |  | |
| 0x19 | Context Tag 1, length 1: BACnetPropertyIdentifier | |
| 0x55 | Data: Property 85: present-value | |
| 0x3E | Context Tag 3, opening tag: ABSTRACT-SYNTAX.&Type | |
| 0x44 | Application Tag 4 (Real), length 4 | |
| 0x42 | Data: value = 46.4 | |
| 0x39 |  | |
| 0x99 |  | |
| 0x9A |  | |
| 0x3F | Context Tag 3, closing tag | |
| 0x1F | Data CRC | |
| 0x6D |  | |
|  | PTP REQUESTER acknowledges | |
| 0x55 | Preamble | |
| 0xFF |  | |
| 0x07 | Frame Type 7: Data Ack 1 XON | |
| 0x00 | Length = 0 | |
| 0x00 |  | |
| 0x23 | Header CRC | |

Embodiments can also be used in Radio over Internet Protocol (RoIP) systems. RoIP is similar to VoIP (Voice over Internet Protocol), but attempts to replace two-way radio communications rather than telephone calls. With RoIP, at least one end of a connection is a radio receiver or transceiver connected to a base station that uses IP to connect to a remote device. The other device can be another two-way radio or base station, but could also be a POTS telephone, computer, Skype phone, PDA (Personal Digital Assistant), smartphone, or some other communications device accessible over IP. RoIP can be deployed over private networks of wireless base stations, as well as the public Internet. It is useful in land mobile radio situations like public safety systems.

In one embodiment, the physical security policies are defined in a visual policy manager using actionable representations of physical, network and IT systems as defined and configured in the system. Users, such as security administrators, define the data and event flow through the various physical security systems, rules that are run on it and the actionable events that are created from a policy engine as a result of rules execution. The rules thus defined are converted into standardized rules definitions based on XML format. These rule files are supplied to the physical security policy process, states and actions module. This module stores the rules and applies them to every data or alarm event that is propagated through it creating actions that determine persistence, propagation or alarm events such as storing the data in the data repository, creating a workflow for task assignment or verification, generating alarms or events for external systems (e.g., e-mail or pager notifications, or SNMP for network management systems), or assignment/revocation of requisite access privileges and propagating the change to relevant security systems.

Managed Physical Security System Policy Manager

In one embodiment, the integrated physical security management process is included within an overall managed physical security system (MPSS). A policy manager within the MPSS provides administrators and users the ability to define policies and real time oversight mechanisms to ensure corporate (or other entity) policy compliance and monitoring across distributed physical and IT security systems.

A policy is a user-defined logical entity that acts as a container for rules that are contained in the policy definition. The user typically creates a policy and then adds rules to the policy. Multiple policies can be created in the system to fulfil objectives that are necessary for successful management of distributed enterprise physical security systems. These include: an oversight mechanism over data changes occurring throughout the physical security infrastructure, enforcement of corporate policies by defining system policies that mirror corporate security guidelines; monitoring compliance through tracking of violations, generating alarms on violations; and performing task assignment for security/administration personnel to resolve possible policy violations.

All data flow in the integrated physical security management process is controlled by policies, which are managed and processed by the policy manager. Policies can be categorized into several different types. The first type are system policies, which define the general flow of data between the managed systems and represent the set of rules that are applied to data objects for system level replication. For example, a system policy is the set of rules that determine if a system, Chicago-1, can accept data from another system, Dallas-2. System policies are always defined from the context of the receiving system, i.e., the system indicates whether it would be willing to accept a change on data made by some other system. System policies are defined generally at the time a system is added by defining the orchestration for it. Policies that recognize the attribute level differences between systems and determine how to propagate data are a special case of system policies. An example of this is the clearances attached to a person object by means of a user profile. If a person object is being propagated to a system that does not support all the clearances attached to the object then the policy manager will 'strip' the additional clearances before propagating the changed object to the MPSS.

A second type of policy is a user policy. User policies are similar to system policies, but are more granular and apply to the attributes within the data object. The conditions for rule execution are based on object attributes. For example, a rule can be defined that prevents a change to the Social Security Number by any system other than a headquarter HR system to be propagated across to other systems. This rule execution would result in the person data object being dropped, and also to cause such an event to raise an alarm in the system. One distinction between system and user policies lies in the fact that user policies are configurable by users in order to block propagation, detect policy violations and raise alarms.

Policies are logical entities that allow easy grouping of rules in order to understand, view, enable and order them as one group. Rules are the actual and lowest level combination of Condition-Action sequences that are applied to the data objects passing through the process. The policy manager applies one rule at a time to the data passing through the system. In general, a policy can comprise one or many rules; the rules are applied on data in sequential order—starting from top to bottom; the order of execution of rules can be changed; a rule inside a policy can be enabled or disabled to allow a user to define rules but not enable them for processing until a later time.

Rules are logically composed of separate components that facilitate the creation of complex expressions that are processed internally by the policy manager. A source to destination pre-condition component defines the precondition for data changes propagating initiated by one physical security system to other security systems, and helps define a system specific context to the rule. A condition component provides a mechanism by which the rule is evaluated to determine if the defined action should be performed or not. The conditions are defined as logical expressions that are defined using the data objects that can be used as condition objects. For example, in the logical expression "UserID='jdoe'" is a condition that can be defined using an expression operator '=' and two objects UserID (predefined) and "jdoe" (user input string). An action component defines the action that the policy manager should perform when a rule condition is met.

For policies to serve their purpose, they must be applied at the right point in the lifecycle of the data flowing through the system. The key data points through which messages and events flow are as follows: (1) a data change in the MPSS is detected by the agents in the integration layer 603; (2) a request for the change is generated by the agent for the channel that aggregates communication from the integration layer components; (3) a channel propagates the change to the adapter which is responsible for persisting the changes and broadcasting it to other modules, as well as external systems; and (4) requests are created for other MPSS and other applications interested in receiving the changed object. Policies are generally applied when a data object is received at the agent 'edge' of the SAFE system—be it destined for a MPSS (a change being propagated from SAFE to other MPSS) or the system itself. For data objects being propagated to other MPSS, only a change that has initially being received from a MPSS and subsequently written successfully can be a candidate for further propagation to other MPSS. For the policy definitions that define rules using the source system information as a condition, to work correctly the original source system information must be maintained in the data object request when propagating that change from SAFE.

Rules are written and read from left to write, and this also represents the flow of the data message. The shapes on a diagram successively apply the conditions and actions as the message 'flows' through. Some shapes can be placed multiple times—like parallel actions. Others are restricted to one instance or other interconnection restriction. All shape behaviors and properties are defined when the shape is created. A number of basic types of shapes are utilized by the system: object shapes, condition shapes, actions shapes, modification shapes, references, and connectors.

Figure 7:
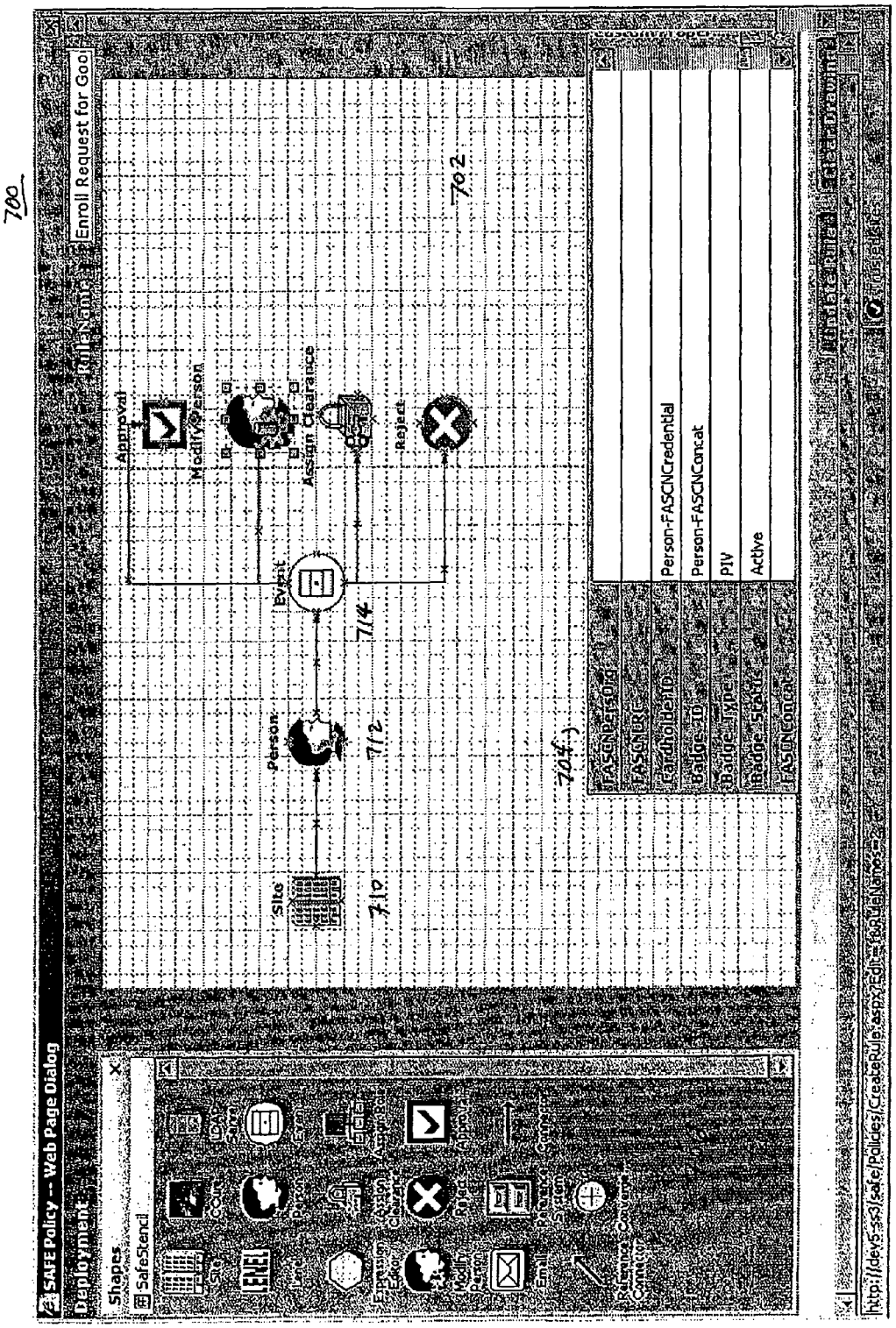
FIG. 7 is an illustrative web page of a visual policy editor for creating rules representing Managed Physical Security Systems and related processes, under an embodiment.

Object shapes represent entities or actors in the system. Example shapes, as shown in FIG. 7 include a graphic of a building for a site, a graphic of a person for an actor or personnel within the system, and a standard flowchart decision diamond for a decision. Condition shapes are used to create conditional expressions in rules. These can include selecting changes coming from a particular application, physical access control system, data source or self service system, selecting personnel data changes based on the values of the attributes in the personnel schema relevant to the source system, and defining more complex expressions in a decision box. Action Shapes that are used to create resultant actions in rules based on the preceding conditions, such as: raising an alarm condition, sending e-mail notifications, creating and assigning approval workflows, and rejecting (or blocking) changes from getting persisted to the MPSS. Modification shapes are used to create modifiers of the incoming data based on the preceding conditions. These include: mapping personnel attributes in a particular way to match the MPSS capabilities or modifying access badges, activation and deactivation dates etc., assigning or removing personnel's access privileges or clearances to physical locations or assets, and assigning or removing role-based access privileges. Reference shapes are used to create references for lookups and comparisons by the rules engine in real-time while processing the incoming data based on the preceding conditions. These include looking up additional information on provisioned personnel in LDAP, Active Directory, ODBC, and JDBC data repositories. Information lookup can be for the purpose of getting additional attributes, validating personnel credentials or for cross checking the results of other processes, such as training, compliance and background checks, and so on. Connectors are directional lines terminating in an arrowhead. These represent the flow of the rule conditions, actions and also data. The placement of connectors determines the precedence of operations and also defines Boolean expressions in conditions. Connectors can be sequential connections with one condition shape connected to another for an AND condition, or parallel connections with one condition shape in parallel with another for an OR condition.

Figure 12:
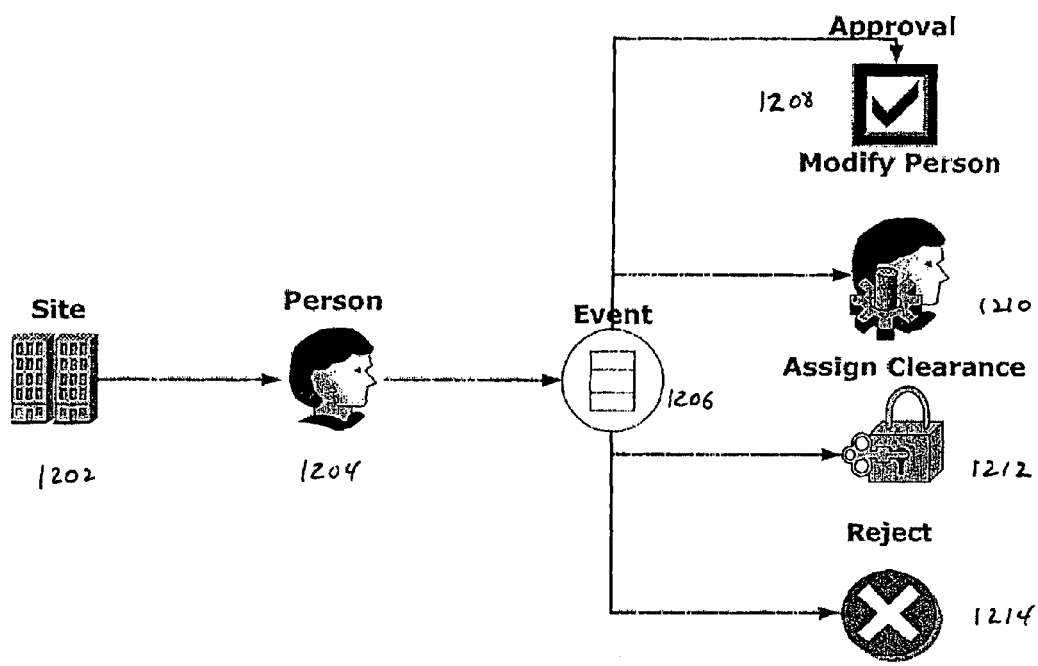
FIG. 12 illustrates an example rule that can is created by a policy manager, under an embodiment.

FIG. 7 includes an illustrative rule, which is shown in greater detail in FIG. 12. The rule can be read as follows: IF a data change comes from Site (filtered by attributes for Site object) e.g. corporate LDAP server, AND IF the data type is Person (filtered by attributes defined for Person object schema for this site, e.g. Person-Employee-Type=Contractor), AND IF Event type matches (the condition defined in the Event shape attributes), THEN Send Data Change Request for Approval. Approval shape includes attributes that define the approvers, status of request and the level of approvals it has to go through before final commit to the system, Modify Person Data Change Request (e.g., to change the physical access badge type to Contractor), Assign default access levels or clearances (e.g., Corp. HQ Lobby Access), and Do not allow the change to be persisted yet since it is pending approval.

Multiple such rules can be created to define a ladder of rules that are applied to every change message that is processed by the orchestration and rules engine. Precedence of rules can be altered by changing the rule order and thus the order of execution of the rule by the rules engine. Similarly, rules can be enabled or disabled.

Rule expression operators are used for defining and evaluating comparative expressions involving the condition objects, which are predefined in the system to be used in the web UI and policy manager. Examples of simple operators are:
1. EQUAL TO
2. NOT EQUAL TO
3. LESS THAN
4. GREATER THAN
5. CONTAINS
6. STARTS WITH In one embodiment, Boolean operators such as AND, OR, NOT etc. can also be provided as rule expression operators. Alternatively, Boolean operations can be created either by defining individual multiple rules for execution or defining multiple actions for the same rule.

Every rule has an action associated with it. A rule can have multiple actions defined for it that are performed when the condition specified in the rule matches it. All actions are performed exclusively and do not depend on the other actions defined for that rule. Action objects typically act as forwarders of the event/object to the receiving module, for example and Alarm Manager/Conflict Manager allows the user to view and correct the problem indicated by a policy condition. Rule action objects are predefined objects in that provide the definition and logic for the actions that can be selected for a particular rule action. The action objects possible for the rules, in general, are:
1. Stop rule execution—do not process further rules in the policy for that object
2. Increment 'Counter'—remember occurrence
3. Send to alarm manager—raise alarm
4. Send to conflict manager—change pending in case of data modification
5. Tag as policy compliance violation.
6. Do not propagate/write to database.

For policies to serve their purpose it is critical that they be applied at the right point in the lifecycle of the data flowing through the system. The key data points in the system through which messages and events flow are as follows:
1. Data change in the MPSS is detected by the agent
2. Request for the change is generated by the agent for the channel
3. Channel propagates the change to an adapter
4. Adapter receives and writes the change to the database
5. Requests are created for other MPSS interested in receiving the changed object Visual Policy Editor Visual rule building-block objects are created in the data model to represent the normalized physical security systems/devices, data and processes. Representation of the systems and data includes the data mapping, formatting, hierarchical (and other) relationships and the commands specific to the individual types of systems. A stencil is the container/repository of these objects that are used in the policy manager for creating actionable rules for integration of physical security systems, data and processes.

In one embodiment, the system rules are created visually through the use of a stencil of object shapes that represent physical systems, data flow and processes. A web-based interactive visual editor, such as Microsoft Visio Drawing Control can be used. Such a program should have a stencil of shapes representing physical security systems, data objects, workflows, processes, identities, events, and users. Each stencil object is data-driven, which means that it is based on data definitions in the database. This allows for extensibility as well as easy addition of new objects in the stencil to represent new security systems, processes etc. A rule is created by dragging and dropping drawing objects on to the map and interconnecting them to create rules. The policy control component monitors user events and communicates with the server 116 over the network in order to obtain data necessary for defining the rules in real-time. The user is provided a real-time design view of the rule being constructed. Object properties can be changed to construct the rules by selecting the options provided in the property editor of the connected objects. Options and data available to the user, while constructing rules, is based on the properties of the objects and data available in the system.

FIG. 7 is an illustrative web page of a visual policy editor for creating rules representing Managed Physical Security Systems and related processes, under an embodiment. The visual policy editor includes a stencil display area 706 that includes icons for several predefined objects, such as sites, servers, persons, events, connectors, and so on. A main display area 702 allows a user to visually define a rule by placing icons and connectors in appropriate relationships to one another. A descriptor area 704 allows for textual description of the objects within the rule. For the example shown in FIG. 7, the rule comprises an event 714 associated with a person 712 within a site 710. The event is associated with several object data items, such as assign clearance, approve, reject, or modify person.

Figure 8:
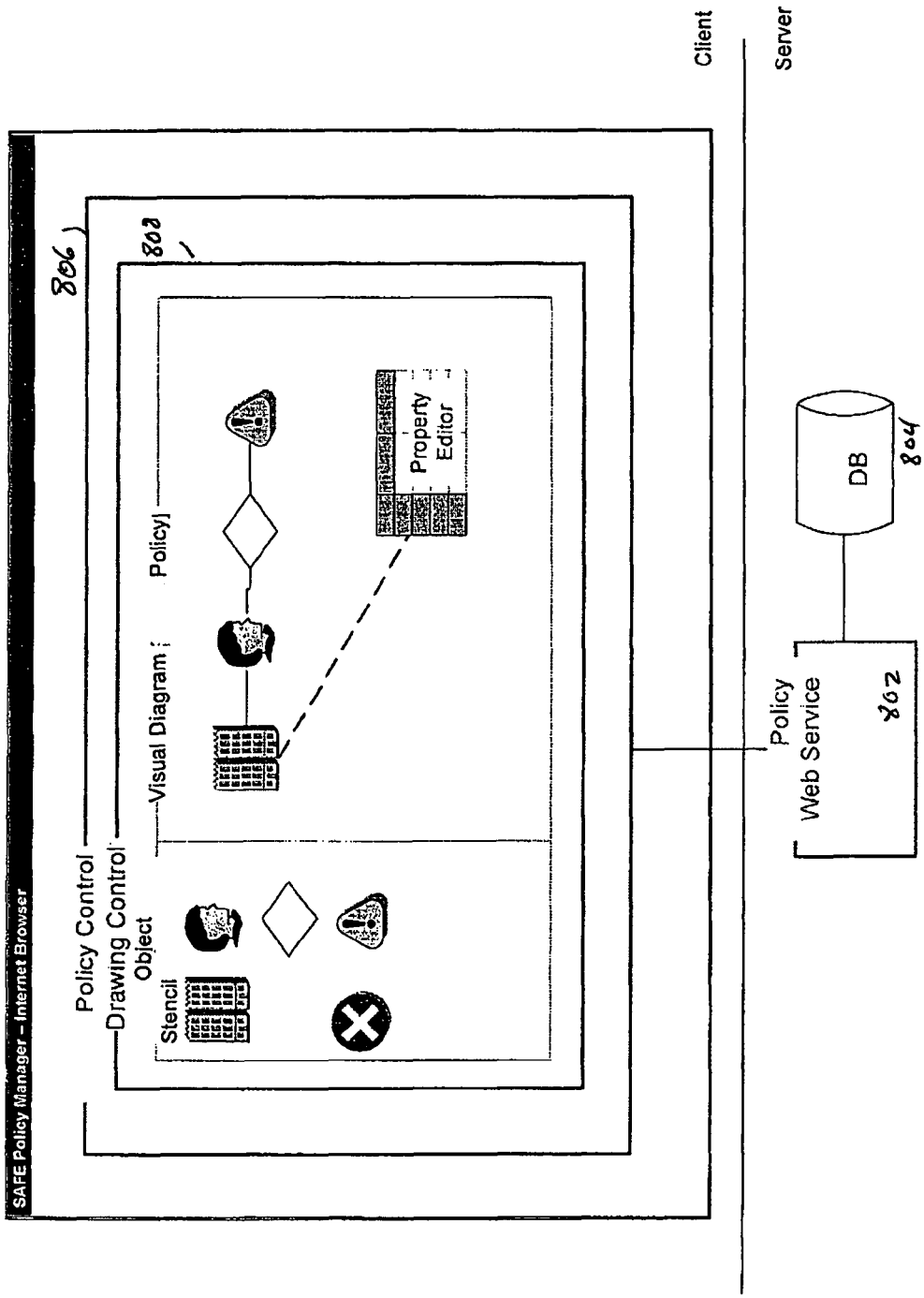
FIG. 8 illustrates a policy manager that uses an object stencil, under an embodiment.

FIG. 8 illustrates a policy manager that uses an object stencil, under an embodiment. The defined object data relationships and real-time web services communicate with the backend process to provide a real-time design view for users to create rules for physical security management. The rules are created within a drawing control panel 808 using the predefined stencil objects, on the client computer. The defined rules are then used by the web service process 802 and stored in a database 804 on a server computer.

Figure 9:
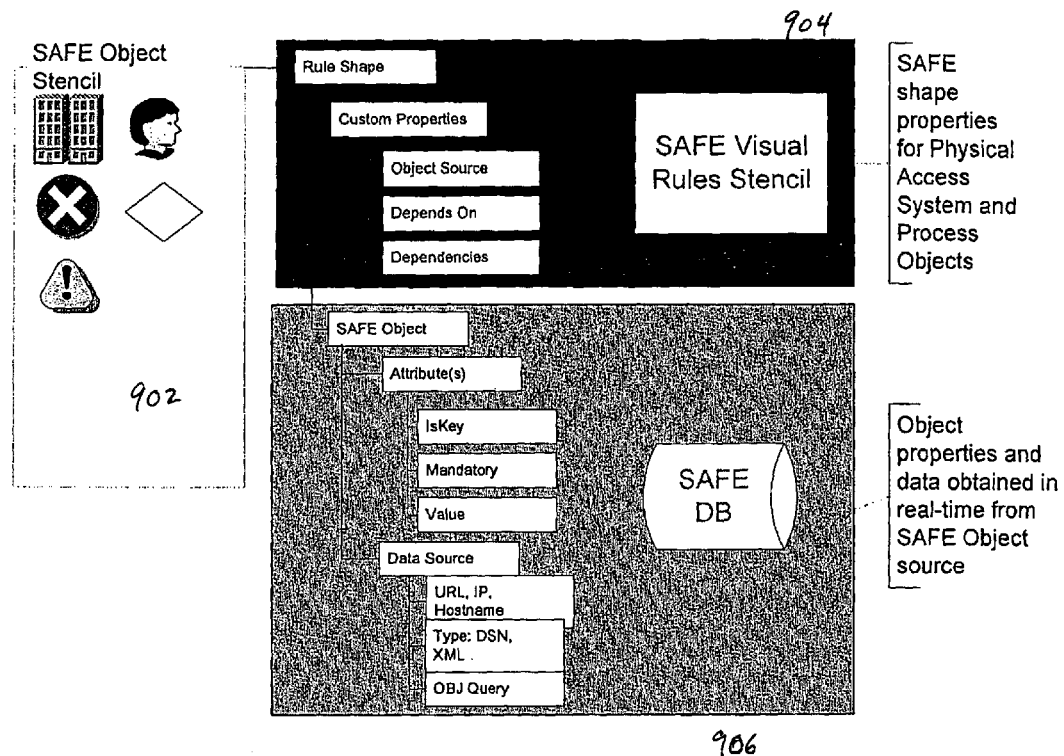
FIG. 9 illustrates a model for relationships of stencil objects to physical security objects and processes, under an embodiment.

FIG. 9 illustrates a model for relationships of stencil objects to physical security objects and processes, under an embodiment. Object stencils 902 are defined within the system and are used as components of the rules. A visual rules stencil 904 defines the shape and properties of these objects within the rule, as well as dependencies of the objects. A database 906 stores the object properties, such as any attributes, data sources, and the like. A schema is a data model that represents the relationships and a way to define the structure, content, and semantics of the data. The following is an exemplary extract from the definition schema of a particular rule object that would define its attributes, relationships and data sources:

```
<xs:annotation>
    <xs:documentation>The root container which contains the schema for
all objects</xs:documentation>
    </xs:annotation>
<xs:complexType>
    <xs:sequence>
        <xs:element name="ObjectSchema" maxOccurs="unbounded">
        <xs:complexType>
            <xs:sequence>
                <xs:element name="KeyFields" type="xs:string" />
                <xs:element name="MandatoryFields" type="xs:string" />
                <xs:element name="CategoryID" type="xs:string" />
```

-continued

```
            </xs:sequence>
            <xs:attribute name="ObjectType" type="xs:string" />
        </xs:complexType>
    </xs:element>
</xs:sequence>
<xs:attribute name="SAFESystemName" type="xs:string" />
<xs:attribute name="VersionNumber" type="xs:string" />
</xs:complexType>
```

Figure 10:
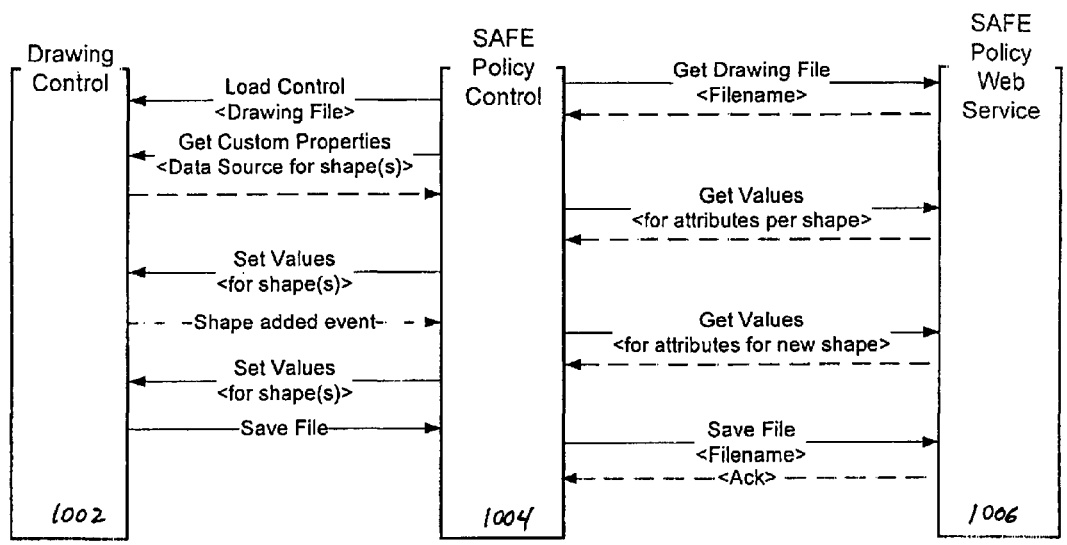
FIG. 10 illustrates interaction between drawing control and web services for the visual policy editor, under an embodiment.

FIG. 10 illustrates interaction between drawing control and web services for the visual policy editor, under an embodiment. The interaction between these two components provides a real-time design view for the policy manager using the stencil objects. As shown in FIG. 10, a policy control component 1004 gets drawing files and values from the service component 1006. The drawing control component 1002 then gets custom properties and sets values for the stencil objects within the rules.

Figure 11:
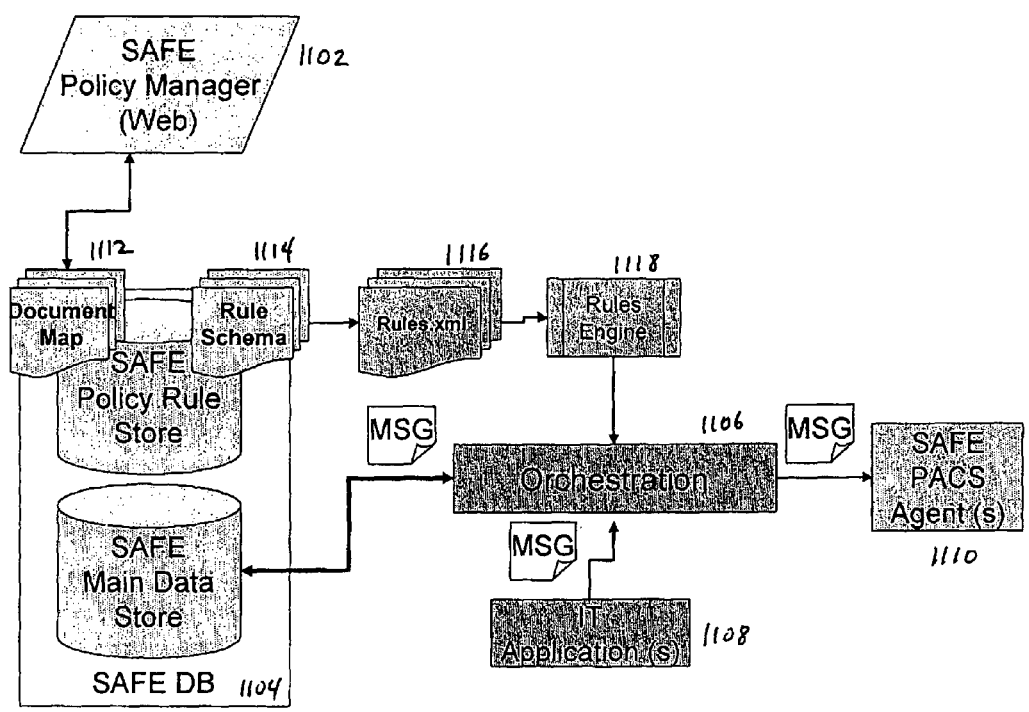
FIG. 11 is a flow diagram illustrating a process of saving a created rule in a database using a visual policy editor, under an embodiment.

FIG. 11 is a flow diagram illustrating a process of saving a created rule in a database using a visual policy editor, under an embodiment. A rule 1114 comprising stencil objects is first created using the visual policy editor, it is then saved in a database 1104, converted to rules XML, and pushed to a rules engine 1118 so that all messages flowing through the system orchestration 1106 are subject to rules defined by the policy manager 1102. These rules are then invoked whenever an IT application 1108 sends an appropriate message to the orchestration component 1106. The rules are also utilized by a PACS agent 1110.

Embodiments of the integrated physical security management process described herein provide a system to process data and events in real-time while enforcing rules and policies thus persisting, propagating physical security data and/or creating alarms and alerts, as well as a system and process to integrate data output and alerts from policies to internal or external physical, network or IT systems, and to create distributed, multi-tier physical security integration, rules processing and event generation system for flexible deployment in small to large corporate, government or public establishments.

Embodiments of the process directly integrate with physical security hardware in a distributed, multi-tier environment to provide a system, process and apparatus for multi vendor, multi technology physical system integration that is media and transport independent to receive data and events, create and enforce policies to affect the outcome of security data persistence, propagation and generation of alerts affecting other physical security, network and IT systems. In this way, processes and systems are provided to discover and define an organizations spatial hierarchy of its global physical security assets (doors, buildings, etc). The disclosed system also provides processes and systems to generate unique physical access credentials for exclusive mapping between an individual's profile (job, department, location, etc) and an organizations spatial hierarchy of its global physical security system deployments (doors, buildings, etc), and generates unique access credentials based on individual profiles and automatic assignment across multiple physical security systems overcoming certain hardware/software limitations of standard access control system/hardware.

Embodiments are directed to methods and systems for maintaining rules based physical security states from disparate, multi-vendor Physical Security Systems which can be mapped to affect network data flow and IT applications access through network equipment through a physical security services software module that can be embedded in network equipment or deployed as discrete equipment to receive physical security systems access control data and events that is used to build and maintain physical security access states in real-time. Such a module provides a system, process and software interfaces for receiving and processing physical security data and events that are used to build and maintain physical security access states in real-time. It also provides a system, process and software interfaces for receiving and translating security policy rules that are applied by the PSS to ongoing physical security data changes and events. The PSS provides a means for rules based mapping of physical security access states and events to data network flow and applications access control that can affect the flow of data and access to network applications in real-time. It also provides software interfaces to register for and obtain physical security related states or rule based states mapped into actions that can be used by network equipment or IT applications to make data flow or access control decisions. The PSS module can be configured to send physical security state rules based control commands to network equipment or IT applications affecting data flow or access control, and to provide a method, system, process and apparatus to embed physical security state rules based control commands in network equipment or IT applications affecting data flow or access control.

Aspects of the integrated physical security system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the physical security system and methods include: microcontrollers with memory (such as electronically erasable programmable read only memory (EEPROM)), embedded microprocessors, firmware, software, etc. Furthermore, aspects of the described methods may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the systems and methods embodying the physical security system and methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the physical security system and methods is not intended to be exhaustive or to limit the systems and methods to the precise form disclosed. While specific embodiments of, and examples for, the methods are described herein for illustrative purposes, various equivalent modifications are possible within the scope of other systems and methods, as those skilled in the relevant art will recognize. The teachings of the physical security system and methods provided herein can be applied to other processing systems and methods, not only for the systems and methods described above.

The elements and acts of the various embodiments described above can be combined to provide further embodiments. These and other changes can be made to the described methods in light of the above detailed description.

What is claimed is:
1. A system comprising:
a plurality of network resources distributed throughout a site, the network resources comprising proprietary and Internet Protocol (IP) enabled security system components including sensors, actuators, alarms and monitoring devices, utilizing physical and Information Technology (IT) security data,
wherein each sensor of the sensors is configured to generate a signal in response to a defined event, and in accordance with a proprietary data format defined specifically for a device by a respective manufacturer of the device;
a single integration layer component that is configured to receive signals from each of the plurality of network resources in the proprietary data format of a respective security component and integrate disparate proprietary data formats for aggregation and processing in other components; the network resources comprising HVAC, lighting, building, video, alarms, identity management, and event security system components;
a central network device security management processor coupled to the plurality of network resources, configured to receive signals from the integration layer by extracting security data and events from network traffic and the security system components to build a continually updated security state of the entire system through a physical security state engine, and a daemon process to generate active access lists and states for physical access control systems, wherein the active access lists define at runtime access privileges for individuals or groups of individuals defined within the system, and further wherein the alarm event messages are generated by a protocol defined trap message and log further wherein the daemon process aggregates all states and event messages;

a normalization component in the central network device security management processor normalizing the signal data from the integration layer component in accordance with a defined data mapping scheme to transform the received signals from the proprietary data format to a corresponding Extensible Markup Language (XML) document configured to describe system policies through the use of virtual objects that comprise components of executable rules, and conforming to a schema that represents relationships between the virtual objects and corresponding devices, objects and processes, wherein the schema defines one or more attributes of the executable rules including inputs from the system components, actions to be taken based on the input, addresses of system components performing the actions, and states to be maintained by the coupled network resources;

a rules definition component defining actionable events definitions and responses to actionable events, physical security policies comprising definitional rules consisting of the virtual objects representing network devices and physical security states used by the plurality of network resources;

a policy manager component defining policies that control a data flow in accordance with the executable rules that are organized into types of policies comprising system, user, and sensor state related policies, and wherein the policies reference the attributes of data objects for each security system component;

a communication integration interface integrating the security data with information technology (IT) data of an entity deploying the system; and a signal processing component applying the executable rules to the normalized signal data and physical security states to generate control signals that invoke the defined responses to the actionable events and to control the security system components in accordance with policies established for entity personnel defined by the integrated security data and access control rules, and transmitting the control signals to the security system components in the respective proprietary format in order to effect network access, data flow and application security and update the security state of the system.

2. The system of claim 1 wherein the network resources comprise network management systems for centralized alarm monitoring, event response, and application of policies for the protection of network resources, wherein the integrated security data reflects the physical security states and comprises a portion of the IT network traffic of the entity, the system further comprising a physical security equipment module coupled to the plurality of network resources and configured to extract the security data from the network traffic to build the physical security states of the system defined by the access control rules, and wherein the security states and their relationships with network resources are managed and depicted through a visual policy editor that processes the virtual objects.

3. The system of claim 1 wherein the network resources comprise subscriber and services provisioning systems for provisioning system users and assigning privileges and granting access to resources based on assigned privileges, and wherein the policies serve to control management of the system in a distributed computing environment by providing at least one of: an oversight mechanism over data changes in the system, enforcement of corporate policies by defining the system policies in accord with security guidelines, monitoring compliance by tracking violations, generating alarms on violations, and task assignments for personnel to resolve policy violations.

4. The system of claim 1 wherein the network resources comprise network services configured to prioritize network traffic and automatically respond to security events, and wherein the system policies are defined by a sending or receiving system and define the flow of data from and to the sending receiving system and are applied to data objects for each unique system level actions and data flows, and wherein the user policies apply to attributes within a data object and are executed based on object attributes other policies, and wherein the user policies are configurable by users to detect policy violations, user actions and data flow actions to raise alarms, and further wherein the policy manager controls changes triggered by one type of policy and effects data flow changes to another type of policy and related data objects to determine state changes of the system.

5. The system of claim 4 wherein each policy of the policies is a user-defined logical entity that serves as a container for executable rules that are contained in a policy definition, and each rule is a lowest level combination of condition-action statements that are applied to the data objects processed by the system, and wherein policies are applied when a data object change is detected from any of the sending or receiving systems, and the policy affects the dataflow of messages destined for any external system or the system itself.

6. A system comprising:

a physical security interface module interfacing to a plurality of security sensors to a plurality of network resources distributed throughout a site, each sensor configured to respond to a corresponding type of actionable event and utilize physical security data including command and content data in accordance with a proprietary data format defined specifically for a sensor by a respective manufacturer of the sensor;

a single integration layer component that is configured to receive signals from each of the plurality of security sensors in the respective proprietary data format and integrate disparate proprietary data formats for aggregation and processing in other components; the network resources comprising HVAC, lighting, building, video, alarms, identity management, and event security system components;

a central network device security management processor coupled to the plurality of network resources, and configured to receive signals from the integration layer component by extracting physical security data and events from network traffic and the network resources to build a continually updated security state of the entire system through a physical state security engine, and a daemon process to generate active access lists and states for physical access control systems, wherein the active access lists define at runtime access information for individuals or groups of individuals defined within the system, and further wherein the alarm event messages are generated by a protocol defined trap message and further wherein the daemon process aggregates the alarm event messages, and to define physical security states used by the plurality of network resources;

an integration module within the integration layer component including an agent for each type of security sensor to accept the physical security data from each security sensor in the respective proprietary format, and to integrate the physical security data with information objects and processes, wherein the schema defines one or more attributes of the executable rules including inputs from the devices, actions to be taken based on the input, addresses of system components performing the actions, and states to be maintained by the plurality of network resources;

a signal processing component applying executable rules to the normalized signal data and physical security states to generate control signals that invoke defined responses to actionable events and to control the sensors in accordance with policies established for entity personnel defined by the IT data and with physical access control rules, and transmitting the control signals to the sensors in their respective proprietary format;

a policy manager component policies that control a data flow in accordance with the executable rules that are organized into two or more types of policies comprising system, user, and sensor state related policies, and wherein the policies reference attributes of data objects for each sensor; and a physical security equipment module coupled to the plurality of network resources and configured to extract the physical security data from network traffic to build the physical security states of the system defined by physical access control rules and update the security state of the system, and wherein the physical security states and their relationships with network resources are managed and depicted through a visual policy editor that processes the virtual objects through a user interface.

7. The system of claim 6 wherein the plurality of sensor types comprise physical access, intrusion, and environmental conditions.

8. The system of claim 6 wherein the normalization module converts the proprietary data format for each security sensor into XML format.

9. The system of claim 6 further comprising a rules engine applying the executable rules on the content data and commands from each security sensor, and wherein each policy of the policies is a user-defined logical entity that serves as a container for executable rules that are contained in a policy definition, and each rule is a lowest level combination of condition-action statements that are applied to the data objects processed by the system, and wherein policies are applied when a data object change is detected from any of the sending or receiving systems, and the policy affects the dataflow of messages destined for any external system or the system itself.

10. The system of claim 6 wherein the network resources comprise network management systems for centralized alarm monitoring, event response, and application of policies for the protection of network resources, and wherein the policies serve to control management of the physical security system in a distributed computing environment by providing at least one of: an oversight mechanism over data changes in the system, enforcement of corporate policies by defining the system policies in accord with security guidelines, monitoring compliance by tracking violations, generating alarms on violations, and task assignments for personnel to resolve policy violations.

11. The system of claim 6 wherein the network resources comprise subscriber and services provisioning systems for provisioning system users and assigning privileges and granting access to resources based on assigned privileges.

12. The system of claim 6 wherein the network resources comprise network services configured to prioritize network traffic and automatically respond to security events.

13. The system of claim 6 wherein the network resources comprise communication systems selected from the group consisting of: telephonic communication, radio communication, and internet protocol (IP) communication.

14. The system of claim 6 wherein the visual editor represents each normalized physical sensor as an object containing one or more attributes that define a spatial relationship to other objects through one or more executable rules.

15. A method of managing data and events related to information technology security, in a security management process comprising:

defining a first plurality of objects representing actors, facilities, physical security states, and network resources within a managed site comprising security components utilizing physical security data and information technology (IT) data;

defining a second plurality of objects representing actions, conditions and references;

constructing a rule from the first plurality of objects and second plurality of objects through connectors that dictate process flow by the first and second plurality of objects;

receiving a plurality of signals from disparate security devices distributed throughout the site, wherein each signal of the plurality of signals is formatted in accordance with a proprietary format defined specifically for a device specified by a manufacturer of each respective security device; the network resources comprising HVAC, lighting, building, video, alarms, identity management, and event security system components;

receiving, in a single integration layer component from each of the plurality of objects in the proprietary data format of a respective security component and integrate disparate proprietary data formats for aggregation and processing in other components;

extracting physical security data and events from network traffic and the security components to build a continually updated security state of the entire system through alarm event messages generated by the network resources, wherein the alarm event messages are generated by a protocol defined trap message and a system log daemon process aggregates the alarm event messages;

building, in a physical security state engine, active access lists and states for physical access control systems through the extracted physical security data and the daemon process, wherein the active access lists define at runtime access information for individuals or groups of individuals defined within the system;

normalizing the plurality of signals from each proprietary format to an Extensible Markup Language (XML) format to produce normalized signal data, wherein the XML format is configured to describe system policies through the use of virtual objects that comprise components of executable rules, and represents relationships between the virtual objects and corresponding devices, objects and processes, and wherein the schema defines one or more attributes of the executable rules including inputs from the system components, actions to be taken based on the input, addresses of system components performing the actions, and states to be maintained by the network resources;

integrating the physical security data with the information technology (IT) data of an entity within the managed site;

processing the signals and physical security states through the rule to perform an action in accordance with the rule, wherein the action effects a change in one or more settings for the network resources to control the security system components in accordance with policies established for entity personnel defined by the IT data and with physical access control rules of the managed site;

defining policies that control a data flow in accordance with the physical access control rules that are organized into two or more types of policies comprising system, user, and sensor state related policies, and wherein the policies reference attributes of data objects for each security system component;

applying the rule to the normalized signal data and the first plurality of objects to generate control signals that invoke defined responses to actionable events and control the security system components in accordance with defined policies;

transmitting the control signals to the security system components in their respective proprietary format; and extracting the physical security data from the network traffic to build the security states defined by the physical access control rules and update the security state of the system.

16. The method of claim 15 wherein the rule is constructed using a graphical visual policy editor that processes virtual objects, and wherein the physical security states and their relationships with network resources are managed and depicted as the virtual objects.

17. The method of claim 15 wherein the rule dictates a response to a physical intrusion event, and wherein the action is selected from the group consisting of: generating an alarm, providing an alert to official personnel, or preventing access to areas of the site, and wherein the policies serve to control management of the security system in a distributed computing environment by providing at least one of: an oversight mechanism over data changes in the system, enforcement of corporate policies by defining the system policies in accord with security guidelines, monitoring compliance by tracking violations, generating alarms on violations, and task assignments for personnel to resolve policy violations.

18. The method of claim 15 wherein the rule dictates a network backup action within the network resources.

19. The method of claim 15 wherein the action comprises one of: restricting access of personnel to one or more devices of the network resources, and wherein the policies serve to control management of the security system in a distributed computing environment by providing at least one of: an oversight mechanism over data changes in the system, enforcement of corporate policies by defining the system policies in accord with security guidelines, monitoring compliance by tracking violations, generating alarms on violations, and task assignments for personnel to resolve policy violations.

20. The method of claim 15 wherein the disparate security devices are selected from the group consisting of: proximity alarms, infrared detectors, motion sensors, smoke detectors, bar code readers, and biometric sensors.

* * * * *